(12) United States Patent
Sasaki et al.

(10) Patent No.: US 11,112,138 B2
(45) Date of Patent: Sep. 7, 2021

(54) AIR-CONDITIONING CONTROL METHOD AND AIR-CONDITIONING CONTROL DEVICE

(71) Applicant: PANASONIC INTELLECTUAL PROPERTY MANAGEMENT CO., LTD., Osaka (JP)

(72) Inventors: Taiji Sasaki, Osaka (JP); Hiroko Sugimoto, Kyoto (JP); Minghao Ni, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/212,159

(22) Filed: Dec. 6, 2018

(65) Prior Publication Data

US 2019/0178514 A1    Jun. 13, 2019

(30) Foreign Application Priority Data

Dec. 8, 2017    (JP) .............................. JP2017-235967

(51) Int. Cl.
*F24F 11/38*    (2018.01)
*F24F 11/00*    (2018.01)
(Continued)

(52) U.S. Cl.
CPC .......... *F24F 11/38* (2018.01); *F24F 11/0008* (2013.01); *F24F 11/56* (2018.01);
(Continued)

(58) Field of Classification Search
CPC ........ F24F 11/38; F24F 11/0008; F24F 11/56; F24F 11/65; F24F 2130/10;
(Continued)

(56) References Cited

U.S. PATENT DOCUMENTS

2005/0251364 A1* 11/2005 Kang ....................... G05B 9/02
702/183
2006/0229739 A1* 10/2006 Morikawa ............ G05B 13/027
700/19

(Continued)

FOREIGN PATENT DOCUMENTS

CN    101248984    8/2008
CN    201973836 U    9/2011
(Continued)

*Primary Examiner* — Michael D Masinick
(74) *Attorney, Agent, or Firm* — Greenblum & Bernstein, P.L.C.

(57) ABSTRACT

An air-conditioning control method includes: acquiring a first sensor value measured by a first sensor device provided at a different position within an identical space to a second sensor device at a first frequency; acquiring a second sensor value measured by the second sensor device at a second frequency, wherein the second frequency is higher than the first frequency; generating a first sensor predicted value from the second sensor value based on a correlation between the first sensor value and the second sensor value in a period in which the second sensor value is acquired and the first sensor value is not acquired; and determining an operation of an air-conditioning apparatus based on the first sensor predicted value.

14 Claims, 25 Drawing Sheets

(51) Int. Cl.

| | |
|---|---|
| *F24F 11/56* | (2018.01) |
| *F24F 11/65* | (2018.01) |
| *G05B 13/04* | (2006.01) |
| *G05B 13/02* | (2006.01) |
| *F24F 130/10* | (2018.01) |
| *F24F 110/10* | (2018.01) |
| *F24F 110/12* | (2018.01) |
| *F24F 110/20* | (2018.01) |
| *F24F 110/64* | (2018.01) |
| *F24F 120/12* | (2018.01) |

(52) U.S. Cl.
CPC .......... *F24F 11/65* (2018.01); *G05B 13/0265* (2013.01); *G05B 13/048* (2013.01); *F24F 2110/10* (2018.01); *F24F 2110/12* (2018.01); *F24F 2110/20* (2018.01); *F24F 2110/64* (2018.01); *F24F 2120/12* (2018.01); *F24F 2130/10* (2018.01); *F25B 2700/02* (2013.01); *F25B 2700/2104* (2013.01)

(58) Field of Classification Search
CPC .......... F24F 2700/2104; F24F 2110/10; F24F 2110/12; F24F 2110/20; F24F 2110/64; F24F 2120/12; F24F 11/46; F24F 11/64; G05B 13/048; G05B 13/0265; F25B 2700/2104; F25B 2700/02
See application file for complete search history.

(56) References Cited

U.S. PATENT DOCUMENTS

| | | | |
|---|---|---|---|
| 2008/0208480 A1 | 8/2008 | Kuriyama et al. | |
| 2008/0270162 A1* | 10/2008 | Machacek | G05B 23/0221 702/182 |
| 2009/0140059 A1* | 6/2009 | Barton | G05D 23/1905 236/51 |
| 2012/0245748 A1* | 9/2012 | Kumar | F02C 3/28 700/288 |
| 2014/0229017 A1 | 8/2014 | Oyama | |
| 2014/0271181 A1* | 9/2014 | Perley | F03D 7/024 416/1 |
| 2016/0124475 A1* | 5/2016 | Chandra | G06F 1/3234 700/300 |
| 2016/0261481 A1* | 9/2016 | Ogata | H04L 43/10 |
| 2017/0284692 A1* | 10/2017 | Banerjee | G05B 19/042 |
| 2017/0341486 A1* | 11/2017 | Petrak | F04D 25/06 |
| 2018/0113498 A1* | 4/2018 | Cronin | G06F 1/3206 |
| 2018/0202280 A1* | 7/2018 | Williams | G05B 13/048 |
| 2018/0375743 A1* | 12/2018 | Lee | H04L 29/08 |
| 2019/0325328 A1* | 10/2019 | Katz | G06F 17/14 |

FOREIGN PATENT DOCUMENTS

| | | | | |
|---|---|---|---|---|
| CN | 105546770 | | 5/2016 | |
| CN | 107062552 | | 8/2017 | |
| JP | 2010-206596 | | 9/2010 | |
| JP | 2017215870 | A * | 12/2017 | |
| WO | WO-2017168458 | A1 * | 10/2017 | ............. G16Z 99/00 |

* cited by examiner

FIG.7

| ID | TIME | SECOND SENSOR VALUE ||||||| AIR-CONDITIONING CONTROL INFORMATION |||||| FIRST SENSOR VALUE |
|---|---|---|---|---|---|---|---|---|---|---|---|---|---|---|
| | | SECOND INDOOR TEMPERATURE (°C) | INDOOR HUMIDITY (%) | OUTDOOR TEMPERATURE (°C) | BLOW-OFF TEMPERATURE | ELECTRIC ENERGY (wh) | PRESENCE/ABSENCE INFORMATION | OPERATION STATUS | SET MODE | SET TEMPERATURE (°C) | AIRFLOW RATE | AIRFLOW DIRECTION | WEATHER INFORMATION | FIRST INDOOR TEMPERATURE (°C) |
| ... | ... | ... | ... | ... | ... | ... | ... | ... | ... | ... | ... | ... | ... | ... |
| 100 | 10:00 SUNDAY AUGUST 14, 2016 | 30.0 | 50 | 32.9 | – | 0 | ABSENT | OFF | – | – | – | – | FINE | 30.0 |
| 102 | 10:01 SUNDAY AUGUST 14, 2016 | 30.1 | 50 | 33.0 | – | 0 | ABSENT | OFF | – | – | – | – | FINE | 30.1 |
| 103 | 10:02 SUNDAY AUGUST 14, 2016 | 30.2 | 51 | 33.0 | – | 0 | PRESENT | OFF | – | – | – | – | FINE | – |
| 104 | 10:03 SUNDAY AUGUST 14, 2016 | 30.2 | 50 | 32.8 | 28.0 | 100 | PRESENT | ON | COOLING | 25 | Lv5 | Dir1 | FINE | – |
| 105 | 10:04 SUNDAY AUGUST 14, 2016 | 30.0 | 49 | 32.7 | 26.0 | 60 | PRESENT | ON | COOLING | 25 | Lv5 | Dir1 | FINE | – |
| 106 | 10:05 SUNDAY AUGUST 14, 2016 | 29.7 | 49 | 32.6 | 24.0 | 40 | PRESENT | ON | COOLING | 25 | Lv5 | Dir1 | FINE | – |
| ... | ... | ... | ... | ... | ... | ... | ... | ... | ... | ... | ... | ... | ... | ... |

FIG.9

| ID | TIME | SECOND SENSOR VALUE ||| AIR-CONDITIONING CONTROL INFORMATION |||||| FIRST SENSOR VALUE OF 10 MINUTES BEFORE | FIRST SENSOR VALUE |
|---|---|---|---|---|---|---|---|---|---|---|---|---|
| | | SECOND INDOOR TEMPERATURE (°C) | INDOOR HUMIDITY (%) | OUTDOOR TEMPERATURE (°C) | BLOW-OFF TEMPERATURE (°C) | PRESENCE/ ABSENCE INFORMATION | OPERATION STATUS | SET MODE | SET TEMPERATURE (°C) | AIRFLOW RATE | AIRFLOW DIRECTION | WEATHER INFORMATION | FIRST INDOOR TEMPERATURE (°C) | FIRST INDOOR TEMPERATURE (°C) |
| ... | ... | ... | ... | ... | ... | ... | ... | ... | ... | ... | ... | ... | ... | ... |
| 100 | 10:00 SUNDAY AUGUST 14, 2016 | 30.0 | 50 | 32.9 | — | ABSENT | OFF | — | — | — | — | FINE | 29.4 | 30.0 |
| 102 | 10:01 SUNDAY AUGUST 14, 2016 | 30.1 | 50 | 33.0 | — | ABSENT | OFF | — | — | — | — | FINE | 29.5 | 30.1 |
| 103 | 10:02 SUNDAY AUGUST 14, 2016 | 30.2 | 51 | 33.0 | — | PRESENT | OFF | — | — | — | — | FINE | 29.6 | — |
| 104 | 10:03 SUNDAY AUGUST 14, 2016 | 30.2 | 50 | 32.8 | 28.0 | PRESENT | ON | COOLING | 25 | Lv5 | Dir1 | FINE | 29.6 | — |
| 105 | 10:04 SUNDAY AUGUST 14, 2016 | 30.0 | 49 | 32.7 | 26.0 | PRESENT | ON | COOLING | 25 | Lv5 | Dir1 | FINE | 29.6 | — |
| 106 | 10:05 SUNDAY AUGUST 14, 2016 | 29.7 | 49 | 32.6 | 24.0 | PRESENT | ON | COOLING | 25 | Lv5 | Dir1 | FINE | 29.7 | — |
| ... | ... | ... | ... | ... | ... | ... | ... | ... | ... | ... | ... | ... | ... | ... |

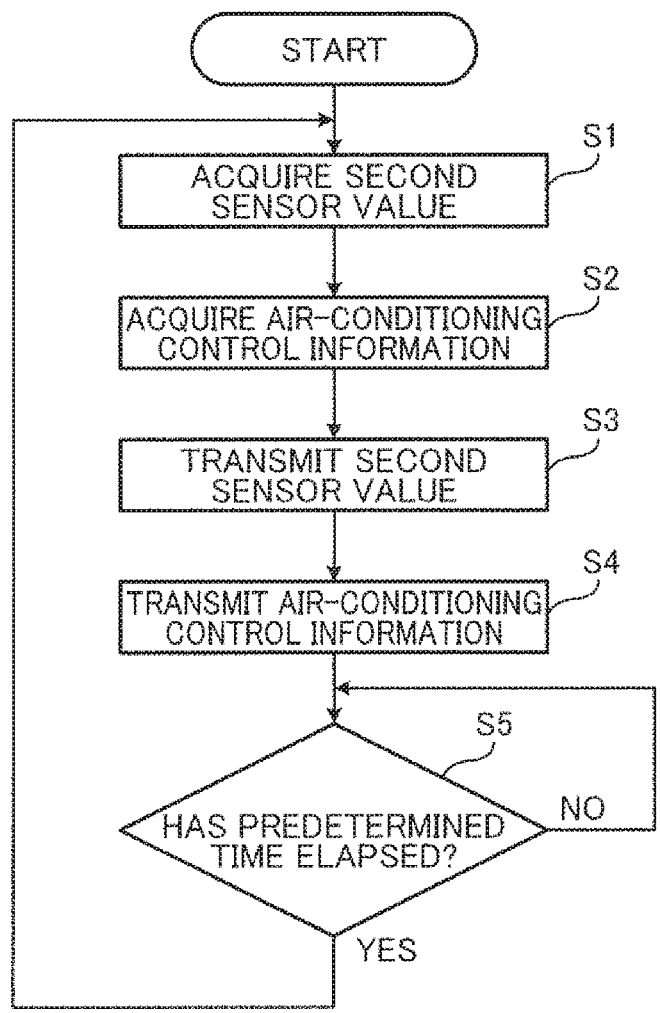

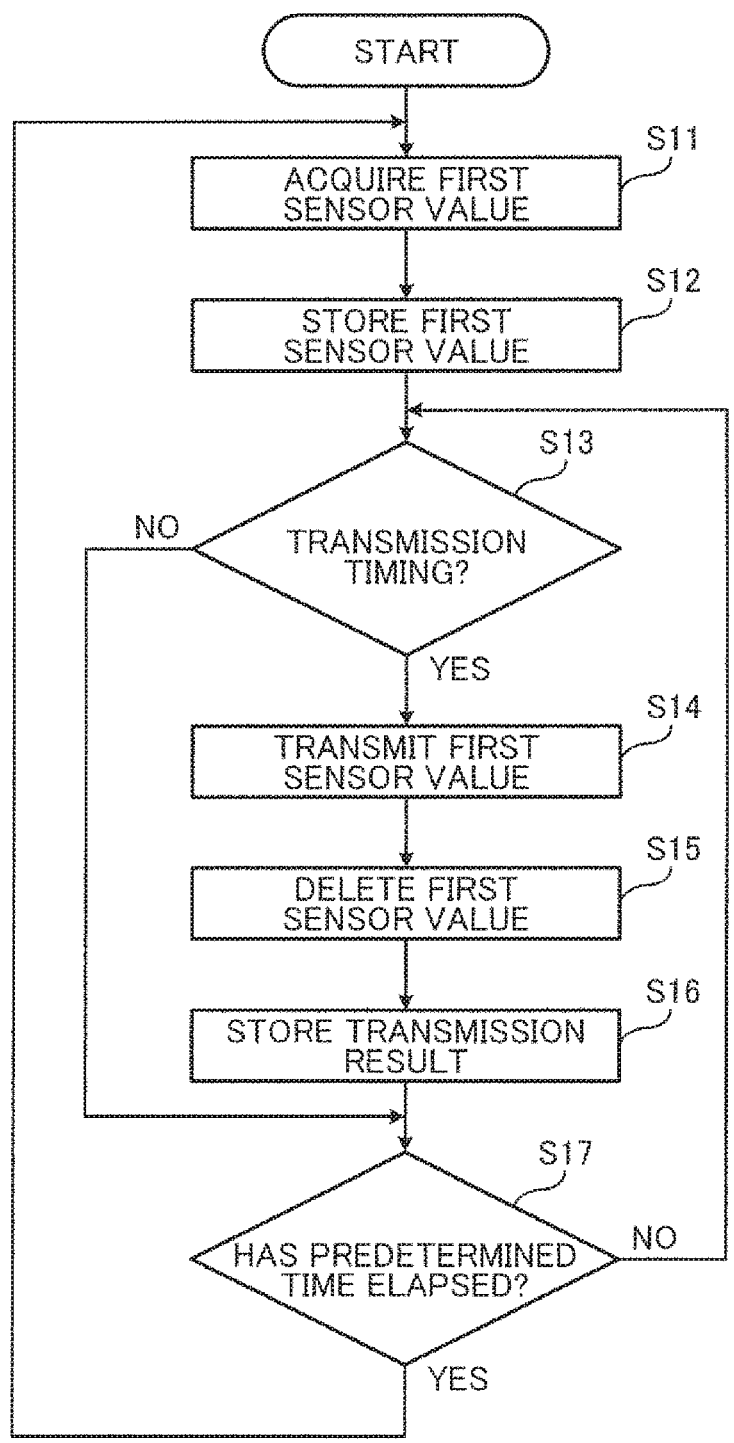

AIR-CONDITIONING CONTROL METHOD AND AIR-CONDITIONING CONTROL DEVICE

FIELD OF THE INVENTION

The present disclosure relates to an air-conditioning control method and an air-conditioning control device for controlling an operation of an air-conditioning apparatus by using a sensor value acquired from an external device other than the air-conditioning apparatus.

BACKGROUND ART

An air-conditioning apparatus includes a temperature sensor and adjusts an air-conditioning level by measuring an indoor temperature with the temperature sensor. For example, in a cooling operation in which a set temperature is 25 degrees C., when a temperature acquired by the temperature sensor of the air-conditioning apparatus is 30 degrees C., the air-conditioning apparatus generates and sends a cold wind into a room by increasing the number of revolutions of a compressor or other methods. Meanwhile, in the cooling operation in which the set temperature is 25 degrees C., when the temperature acquired by the temperature sensor of the air-conditioning apparatus is 20 degrees C., the air-conditioning apparatus determines that it is not necessary to cool the room and weakens an operation of the compressor.

However, the temperature sensor included in the air-conditioning apparatus has the following problem. An indoor unit of the air-conditioning apparatus is physically installed in an upper portion of the room in general, and thus it is difficult to measure the temperature of a place where a person is actually present. Generally, an air temperature of an upper portion of a room is warmer than an air temperature of a lower portion of the room. Even in the same room, a temperature difference of several degrees arises between the upper portion and the lower portion. The temperature sensor included in the air-conditioning apparatus is mounted in the indoor unit of the air-conditioning apparatus, and a position at which the temperature sensor is mounted is close to a position from which the air-conditioning apparatus blows a wind. Therefore, the temperature sensor may measure the temperature of the wind blown from the air-conditioning apparatus. In this way, there is a conventional problem that the temperature measured by the temperature sensor of the air-conditioning apparatus differs from the actual temperature at a position at which a person is present.

Therefore, in order to solve this problem, an air-conditioning control system that transmits temperature information measured at a position different from the air-conditioning apparatus to the air-conditioning apparatus and uses the temperature information for air conditioning control can be considered. The air-conditioning control system includes the air-conditioning apparatus and an external device. The external device is, for example, a remote controller for remotely controlling the air-conditioning apparatus. The external device includes a temperature sensor and a communication unit. The temperature sensor measures the temperature of a space. The air-conditioning apparatus includes an air-conditioning control unit and a communication unit. The communication unit of the external device communicates with the communication unit of the air-conditioning apparatus, for example, by using an infrared signal. The air-conditioning control unit controls the number of revolutions of a compressor to control indoor air-conditioning.

The temperature sensor of the external device regularly measures the temperature near the external device, and the communication unit transmits temperature information to the air-conditioning apparatus. The air-conditioning control unit of the air-conditioning apparatus controls air-conditioning by using the received temperature information. When the external device is disposed at a position close to a person, such a configuration enables accurate air-conditioning control in accordance with the temperature at the position at which the person is present.

It is preferable to place the external device at the position close to a person. In that case, it is preferable that electric power for the external device is supplied from an internal battery without a wire, not from a wall outlet. When the external device is a battery-powered device, its power consumption will be a problem. If the external device acquires the temperature regularly and performs frequent communication, communication processing consumes a lot of electric power, and it is necessary to replace or charge the battery frequently.

For example, in a wireless sensor system of Japanese Patent Application Laid-Open No. 2010-206596, a sensor node corresponding to the external device transmits data to a base station corresponding to the air-conditioning apparatus. Based on the data transmitted from the sensor node, the base station generates prediction data the sensor nodes will generate next, and transmits the generated prediction data to the sensor node. When the prediction data does not agree with the corresponding generated data, the sensor node transmits the generated data to the base station. When the prediction data agrees with the corresponding generated data, the sensor node stops transmission of the generated data. If such a configuration allows a conventional system to accurately predict future data, a data transmission frequency will decrease, enabling reduction in power consumption.

However, it is sometimes difficult for the conventional technique to achieve both reduction in power consumption and accuracy of sensor value prediction, and further improvement has been required.

SUMMARY OF THE INVENTION

The present disclosure has been made to solve the above-described problem, and it is an object of the present disclosure to provide an air-conditioning control method and an air-conditioning control device that can reduce power consumption of a first sensor device provided at a different position within an identical space to a second sensor device, and can accurately predict a first sensor value of the first sensor device.

An air-conditioning control method according to one aspect of the present disclosure includes, by using a processor: acquiring a first sensor value measured by a first sensor device provided at a different position within an identical space to a second sensor device at a first frequency; acquiring a second sensor value measured by the second sensor device at a second frequency, wherein the second frequency is higher than the first frequency; generating a first sensor predicted value from the second sensor value based on a correlation between the first sensor value and the second sensor value in a period in which the second sensor value is acquired and the first sensor value is not acquired; and determining an operation of an air-conditioning apparatus based on the first sensor predicted value.

BRIEF DESCRIPTION OF THE DRAWINGS

FIG. 7 is a diagram showing one example of a data structure of a history DB in the first embodiment of the present disclosure;

FIG. 9 is a diagram showing a modification of the data structure of the history DB in the first embodiment of the present disclosure;

FIG. 10 is a flowchart showing one example of data transmission processing by the air-conditioning apparatus in the first embodiment of the present disclosure;

FIG. 11 is a flowchart showing one example of data transmission processing by the external device in the first embodiment of the present disclosure;

Figure 1:
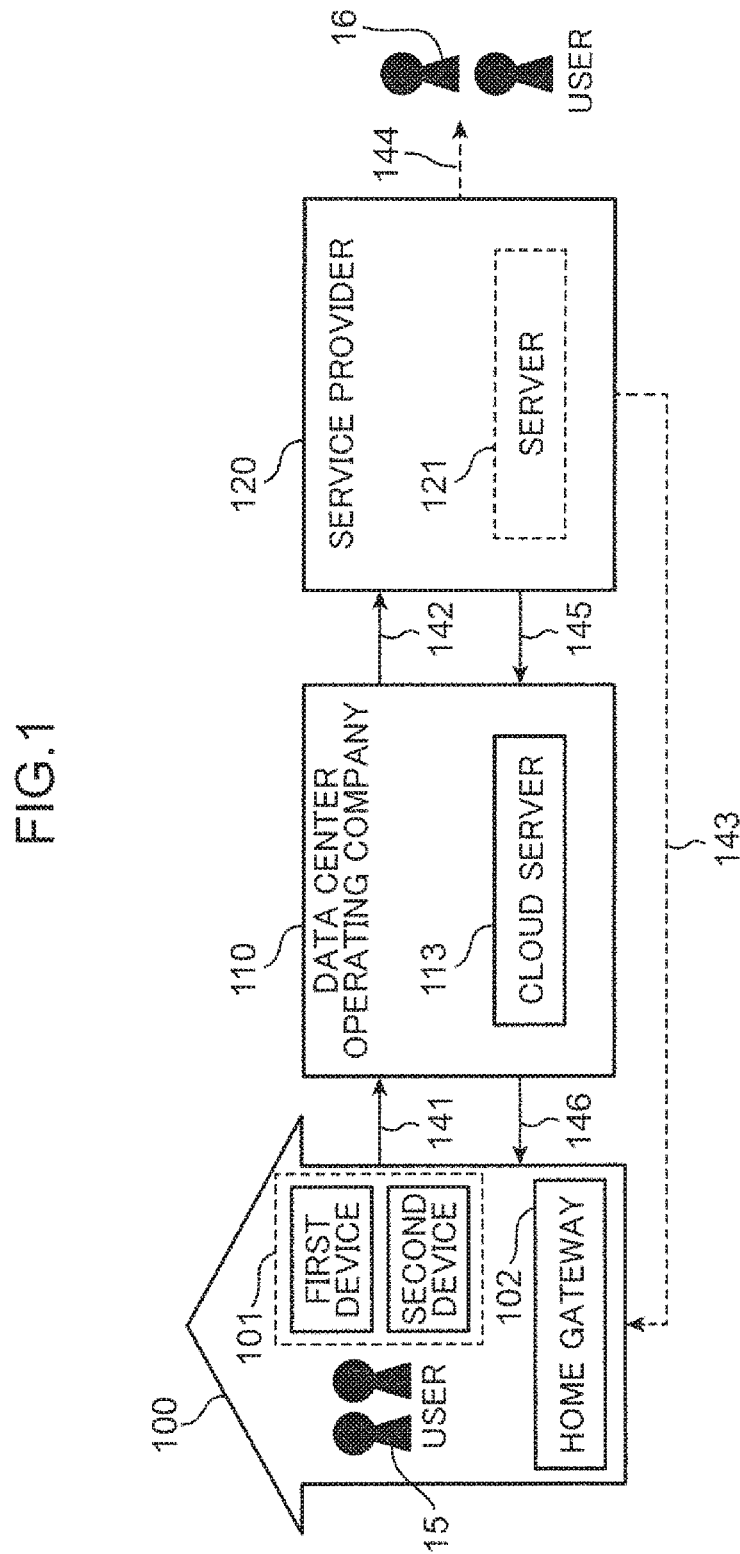
FIG. 1 is a diagram showing an overview of a service to be provided by an air-conditioning control system according to embodiments of the present disclosure.

DESCRIPTION OF EMBODIMENTS (Underlying Knowledge Forming Basis of the Present Disclosure)

It is sometimes difficult for the conventional technique to achieve both reduction in power consumption and accuracy of sensor value prediction. Specifically, the conventional technique predicts future data, but if the predicted data does not agree with the generated data, a transmission frequency cannot be reduced. It is difficult for the conventional technique that predicts future data from past data to cope with a change that occurs in the future. For example, after predicted data is generated using data measured while the air-conditioning apparatus is turned off, when the air-conditioning apparatus is turned on, it is not possible to make a follow-up prediction. Therefore, the generated data does not agree with the predicted data, and the generated data will be transmitted.

In order to solve the above-described problem, an air-conditioning control method according to one aspect of the present disclosure includes, by using a processor: acquiring a first sensor value measured by a first sensor device provided at a different position within an identical space to a second sensor device at a first frequency; acquiring a second sensor value measured by the second sensor device at a second frequency, wherein the second frequency is higher than the first frequency; generating a first sensor predicted value from the second sensor value based on a correlation between the first sensor value and the second sensor value in a period in which the second sensor value is acquired and the first sensor value is not acquired; and determining an operation of an air-conditioning apparatus based on the first sensor predicted value.

With this configuration, the first sensor value measured by the first sensor device provided at the different position within the identical space to the second sensor device is acquired at the first frequency. The second sensor value measured by the second sensor device is acquired at the second frequency, wherein the second frequency is higher than the first frequency. The first sensor predicted value is generated from the second sensor value based on the correlation between the first sensor value and the second sensor value in the period in which the second sensor value is acquired and the first sensor value is not acquired. The operation of the air-conditioning apparatus is determined based on the first sensor predicted value.

Therefore, since the first sensor value is acquired from the first sensor device at the first frequency and the second sensor value is acquired from the second sensor device at the second frequency higher than the first frequency, power consumption of the first sensor device provided at the different position within the identical space to the second sensor device can be reduced. In the period in which the second sensor value is acquired and the first sensor value is not acquired, the first sensor predicted value is generated from the second sensor value based on the correlation between the first sensor value and the second sensor value, and the operation of the air-conditioning apparatus is determined based on the generated first sensor predicted value. Therefore, the first sensor value of the first sensor device can be predicted accurately.

In the air-conditioning control method described above, the first sensor value, the second sensor value, and the first sensor predicted value may include at least one of a temperature, humidity, and a quantity of particulate matter.

With this configuration, the first sensor value, the second sensor value, and the first sensor predicted value include at least one of a temperature, humidity, and a quantity of particulate matter. Therefore, the operation of the air-conditioning apparatus can be determined based on at least one of a temperature, humidity, and a quantity of particulate matter.

In the air-conditioning control method described above, the air-conditioning control method may include determining the first frequency by using the first sensor predicted value and the first sensor value.

With this configuration, the first frequency is determined by using the first sensor predicted value and the first sensor value. Therefore, when prediction accuracy of the first sensor predicted value is low, it is possible to prevent the first sensor predicted value from greatly deviating from the first sensor value by raising the first frequency.

In the air-conditioning control method described above, determining the first frequency may include determining the first frequency based on a difference between the first sensor value in a past and the first sensor predicted value generated from the second sensor value acquired in the past.

With this configuration, in determining the first frequency, the first frequency is determined based on the difference between the first sensor value in the past and the first sensor predicted value generated from the second sensor value acquired in the past.

Therefore, when the difference between the first sensor value in the past and the first sensor predicted value generated from the second sensor value acquired in the past when the first sensor value is acquired in the past is large, it is possible to determine that prediction accuracy of the first sensor predicted value is low. When the prediction accuracy of the first sensor predicted value is low, it is possible to prevent the first sensor predicted value from greatly deviating from the first sensor value by raising the first frequency.

In the air-conditioning control method described above, the air-conditioning control method may include determining an acquisition quantity of the first sensor value by using the first sensor predicted value and the first sensor value.

With this configuration, the acquisition quantity of the first sensor value is determined by using the first sensor predicted value and the first sensor value. Therefore, when prediction accuracy of the first sensor predicted value is high, it is possible to reduce the acquisition quantity of the first sensor value and to reduce a processing load of the first sensor device.

In the air-conditioning control method described above, generating the first sensor predicted value may include generating the first sensor predicted value from the second sensor value by using a prediction model based on the correlation.

With this configuration, in generating the first sensor predicted value, the first sensor predicted value is generated from the second sensor value by using the prediction model based on the correlation. Therefore, it is possible to easily generate the first sensor predicted value by inputting the second sensor value into the prediction model.

In the air-conditioning control method described above, the air-conditioning control method may further include performing machine learning of the prediction model by using the first sensor value, the second sensor value, and the first sensor predicted value.

With this configuration, machine learning of the prediction model is performed by using the first sensor value, the second sensor value, and the first sensor predicted value. Therefore, it is possible to generate the first sensor predicted value more accurately.

In the air-conditioning control method described above, the prediction model may include a plurality of the prediction models learned by learning methods different from each other, and the air-conditioning control method may further include determining each of the prediction models to use from the plurality of prediction models by using the first sensor predicted value and the first sensor value.

With this configuration, the prediction model includes a plurality of the prediction models learned by learning methods different from each other. The prediction model to use is determined from the plurality of prediction models by using the first sensor predicted value and the first sensor value.

Therefore, when prediction accuracy of the first sensor predicted value is low, the current prediction model is changed to another prediction model, and the first sensor predicted value is generated using the other prediction model. Therefore, the prediction accuracy of the first sensor predicted value can be increased.

In the air-conditioning control method described above, the air-conditioning control method may further include detecting an abnormality of the first sensor device by using the first sensor predicted value and the first sensor value.

With this configuration, an abnormality of the first sensor device is detected by using the first sensor predicted value and the first sensor value. Therefore, when prediction accuracy of the first sensor predicted value is low, it is possible to determine that an abnormality has occurred in the first sensor device, and to notify a user of the occurrence of the abnormality in the first sensor device.

In the air-conditioning control method described above, the air-conditioning control method may further include correcting the first sensor predicted value by using a difference between the first sensor value in a past and the first sensor predicted value generated from the second sensor value acquired in the past.

With this configuration, the first sensor predicted value is corrected by using the difference between the first sensor value in the past and the first sensor predicted value generated from the second sensor value acquired in the past.

Therefore, it is possible to correct the first sensor predicted value by adding, to the generated first sensor predicted value, the difference between the first sensor value in the past and the first sensor predicted value generated from the second sensor value acquired in the past when the first sensor value is acquired, and to increase prediction accuracy of the first sensor predicted value.

In the air-conditioning control method described above, the air-conditioning control method may further include acquiring an operating state of the air-conditioning apparatus, and the correlation may include a correlation among the first sensor value, the second sensor value, and the operating state of the air-conditioning apparatus.

With this configuration, the operating state of the air-conditioning apparatus is acquired. The correlation includes a correlation among the first sensor value, the second sensor value, and the operating state of the air-conditioning apparatus.

Therefore, in a period in which the second sensor value is acquired and the first sensor value is not acquired, the first sensor predicted value is generated from the second sensor value based on the correlation among the first sensor value, the second sensor value, and the operating state of the air-conditioning apparatus. Therefore, it is possible to generate the first sensor predicted value in further consideration of the operating state of the air-conditioning apparatus, and to increase prediction accuracy of the first sensor predicted value.

In the air-conditioning control method described above, the air-conditioning control method may further include acquiring weather information indicating a weather condition outside a space in which the first sensor device and the second sensor device are installed, the first sensor device and the second sensor device may be installed at different positions in the identical space, and the correlation may include a correlation among the first sensor value, the second sensor value, and the weather information.

With this configuration, the weather information indicating the weather condition outside the space in which the first sensor device and the second sensor device are installed is acquired. The first sensor device and the second sensor device are installed at different positions in the identical space. The correlation includes a correlation among the first sensor value, the second sensor value, and the weather information.

Therefore, in a period in which the second sensor value is acquired and the first sensor value is not acquired, the first sensor predicted value is generated from the second sensor value based on the correlation among the first sensor value, the second sensor value, and the weather information. Therefore, it is possible to generate the first sensor predicted value in further consideration of the weather information, and to increase prediction accuracy of the first sensor predicted value.

An air-conditioning control device according to another aspect of the present disclosure includes: a communication unit; and a processor. The communication unit is configured to: acquire a first sensor value measured by a first sensor device provided at a different position within an identical space to a second sensor device at a first frequency; and acquire a second sensor value measured by the second sensor device at a second frequency, wherein the second frequency is higher than the first frequency. The processor is configured to: generate a first sensor predicted value from the second sensor value based on a correlation between the first sensor value and the second sensor value in a period in which the second sensor value is acquired and the first sensor value is not acquired; and determine an operation of an air-conditioning apparatus based on the first sensor predicted value.

With this configuration, the first sensor value measured by the first sensor device provided at the different position within the identical space to the second sensor device is acquired at the first frequency. The second sensor value measured by the second sensor device is acquired at the second frequency, wherein the second frequency is higher than the first frequency. The first sensor predicted value is generated from the second sensor value based on the correlation between the first sensor value and the second sensor value in the period in which the second sensor value is acquired and the first sensor value is not acquired. The operation of the air-conditioning apparatus is determined based on the first sensor predicted value.

Therefore, since the first sensor value is acquired from the first sensor device at the first frequency and the second sensor value is acquired from the second sensor device at the second frequency higher than the first frequency, power consumption of the first sensor device provided at the different position within the identical space to the second sensor device can be reduced. In the period in which the second sensor value is acquired and the first sensor value is not acquired, the first sensor predicted value is generated from the second sensor value based on the correlation between the first sensor value and the second sensor value, and the operation of the air-conditioning apparatus is determined based on the generated first sensor predicted value. Therefore, the first sensor value of the first sensor device can be predicted accurately.

Embodiments of the present disclosure will be described below with reference to the accompanying drawings. Note that the following embodiments are one example embodying the present disclosure, and do not limit the technical scope of the present disclosure.

(Overview of Service to be Provided)

First, an overview of a service to be provided by an air-conditioning control system according to the present embodiments will be described.

Figure 2:
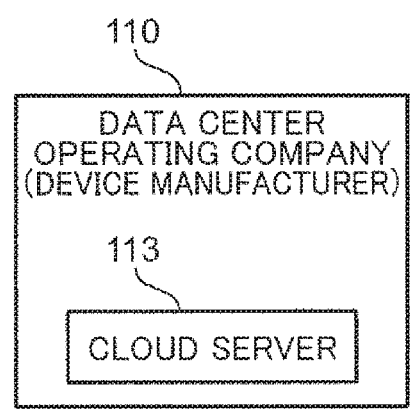
FIG. 2 is a diagram showing an example in which a device manufacturer corresponds to a data center operating company.
Figure 3:
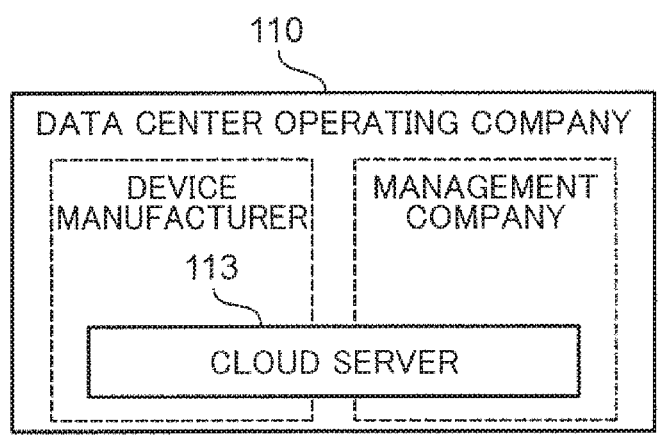
FIG. 3 is a diagram showing an example in which both or one of the device manufacturer and a management company corresponds to the data center operating company.

FIG. 1 is a diagram showing an overview of the service to be provided by the air-conditioning control system according to the present embodiments. FIG. 2 is a diagram showing an example in which a device manufacturer corresponds to a data center operating company. FIG. 3 is a diagram showing an example in which both or one of the device manufacturer and a management company corresponds to the data center operating company. The air-conditioning control system includes a group 100, a data center operating company 110, and a service provider 120.

The group 100 is a group of any scale, for example, a company, an organization, or a home. The group 100 includes a plurality of devices 101 including a first device and a second device, and a home gateway 102. The plurality of devices 101 include devices connectable to the Internet (for example, a smartphone, a personal computer (PC), or a television), and devices that are not connectable to the Internet alone (for example, an illuminator, a washing machine, or a refrigerator). The plurality of devices 101, even if not connectable to the Internet alone, may include a device that becomes connectable to the Internet via the home gateway 102. A user 15 uses the plurality of devices 101 within the group 100.

The data center operating company 110 includes a cloud server 113. The cloud server 113 is a virtual server that cooperates with various devices over the Internet. The cloud server 113 manages huge data (big data) and the like that is difficult for mainly a normal database management tool or the like to handle. The data center operating company 110 performs work including management of data, management of the cloud server 113, and operation of a data center that performs such work. Details of services the data center operating company 110 performs will be described later.

Here, the data center operating company 110 is not limited to a company that performs only management of data or management of the cloud server 113. For example, if a device manufacturer that develops or manufactures one device of the plurality of devices 101 performs work such as management of data or management of the cloud server 113 as shown in FIG. 2, the device manufacturer corresponds to the data center operating company 110. The data center operating company 110 is not limited to one company. For example, as shown in FIG. 3, if a device manufacturer and a management company work together or divide the work to perform management of data or management of the cloud server 113, both or one corresponds to the data center operating company 110.

The service provider 120 includes a server 121. The server 121 mentioned here is a server of any scale, and includes, for example, a memory within a PC for personal use. In some cases, the service provider 120 does not include the server 121.

Note that in the air-conditioning control system, the home gateway 102 is not essential. For example, if the cloud server 113 performs all the data management, the home gateway 102 is unnecessary. In some cases, there is no device that is not connectable to the Internet alone, such as in a case where all the domestic devices are connected to the Internet.

Next, a flow of log information of the devices in the air-conditioning control system (manipulation history information and operation history information) will be described.

First, the first device or the second device of the group 100 transmits each log information item to the cloud server 113 of the data center operating company 110. The cloud server 113 accumulates the log information of the first device or the second device (arrow 141 of FIG. 1). Here, the log information is information indicating, for example, operation situations or operation date and time of the plurality of devices 101. Examples of the log information include viewing history of a television, recording reservation information of a recorder, date and time of operating a washing machine, a quantity of laundry, date and time of opening and closing a refrigerator, or the number of times of opening and closing the refrigerator. The log information may include not only these information items but also various information items that can be acquired from various devices. Note that the log information may be provided directly from the plurality of devices 101 itself to the cloud server 113 over the Internet. Alternatively, the log information may be once accumulated from the plurality of devices 101 to the home gateway 102, and then provided from the home gateway 102 to the cloud server 113.

Next, the cloud server 113 of the data center operating company 110 provides the accumulated log information to the service provider 120 in certain unit. Here, the certain unit may be a unit in which the information accumulated by the data center operating company 110 can be organized and provided to the service provider 120, or may be a unit requested by the service provider 120. Also, it has been described above that the accumulated log information is provided in certain unit, but may not be provided in certain unit. The amount of information to be provided may vary depending on the situation. The log information is stored in the server 121 possessed by the service provider 120 as necessary (arrow 142 of FIG. 1).

The service provider 120 organizes the log information into information suitable for services to be provided to the user, and then provides the user with the information. The user to be provided with the information may be the user 15 who uses the plurality of devices 101, or may be an external user 16. As a method for providing the information to the users 15 and 16, for example, the information may be provided directly from the service provider 120 to the users 15 and 16 (arrows 143 and 144 of FIG. 1). As the method for providing the information to the user 15, for example, the information may be provided to the user 15 via the cloud server 113 of the data center operating company 110 again (arrows 145 and 146 of FIG. 1). The cloud server 113 of the data center operating company 110 may organize the log information into information suitable for services to be provided to the user, and then provide the information to the service provider 120.

Note that the user 15 may differ from the user 16, or may be the same as the user 16.

First Embodiment

Figure 4:
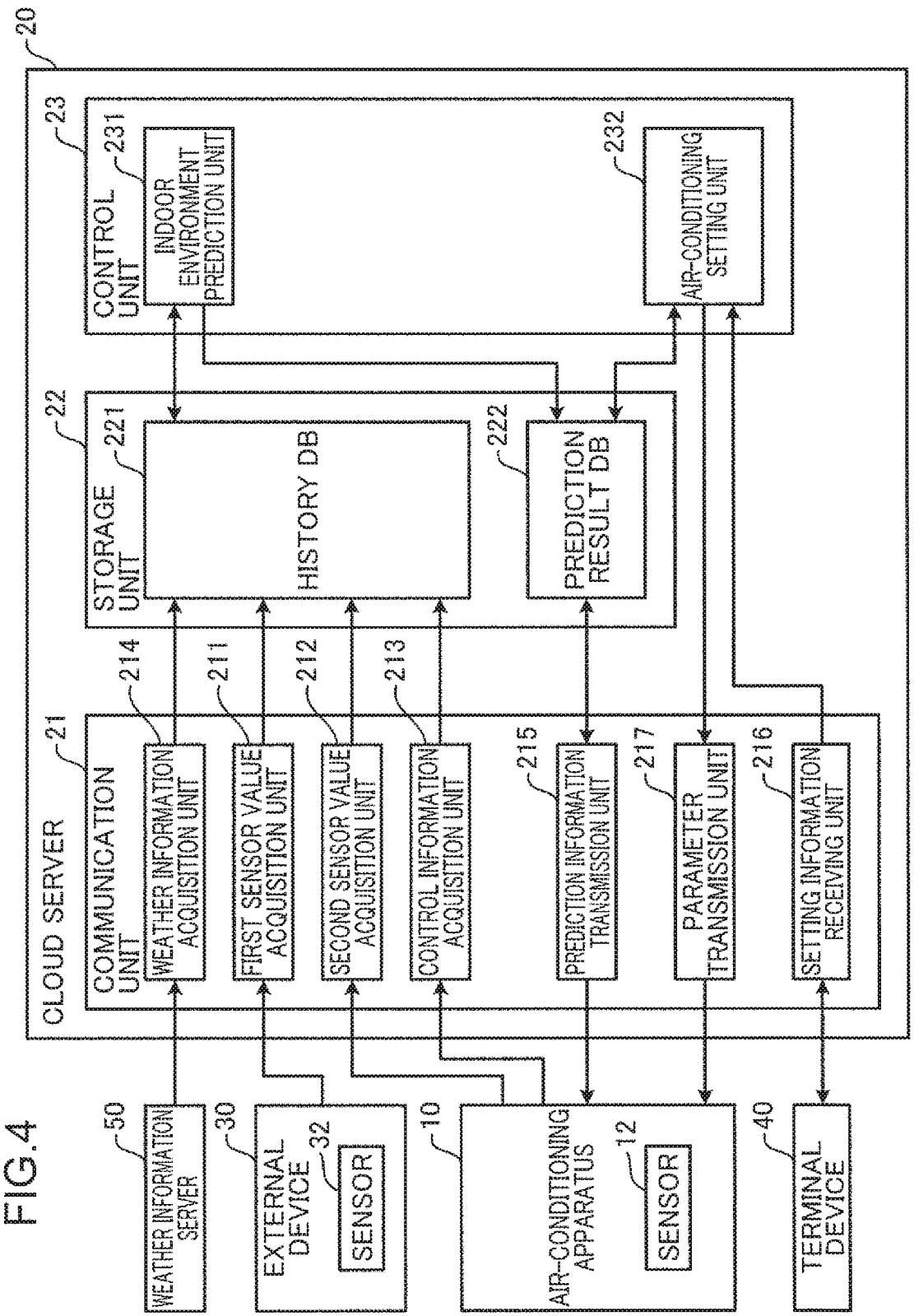
FIG. 4 is a block diagram showing a configuration of an air-conditioning control system and a cloud server in a first embodiment of the present disclosure.
Figure 5:
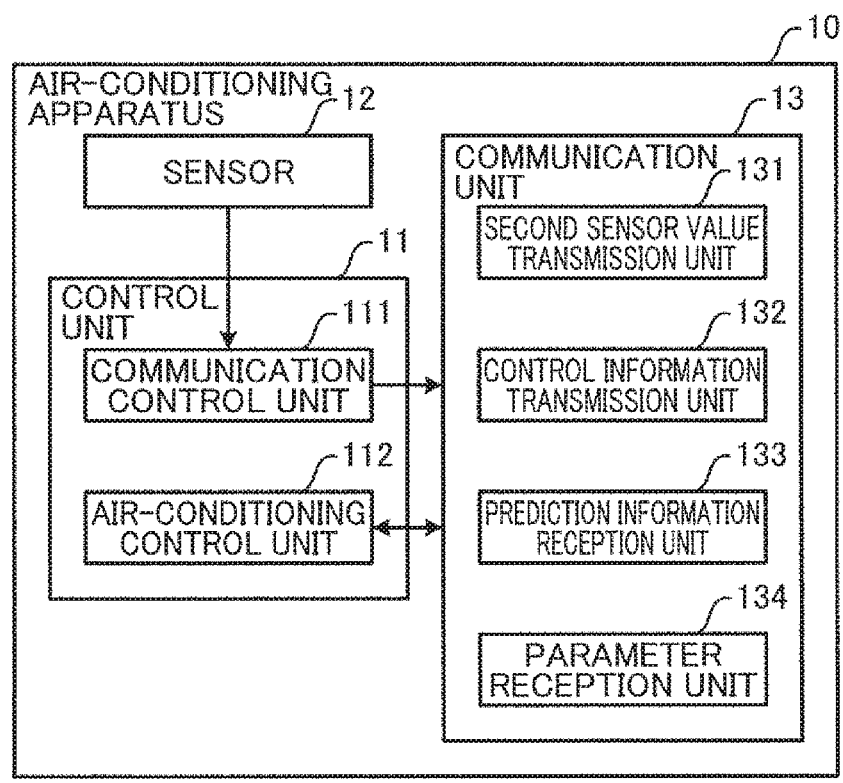
FIG. 5 is a block diagram showing a configuration of an air-conditioning apparatus in the first embodiment of the present disclosure.
Figure 6:
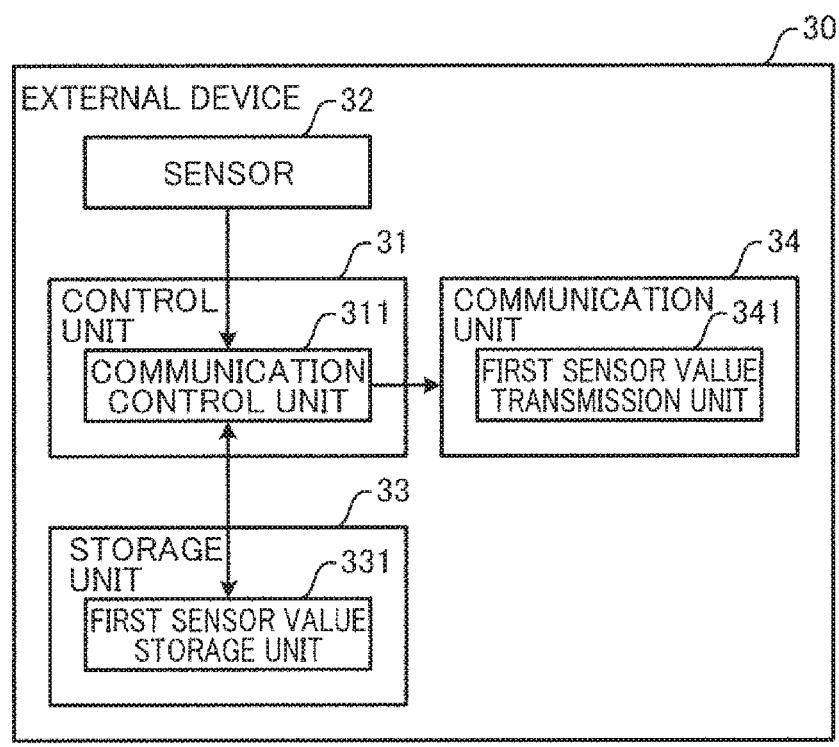
FIG. 6 is a block diagram showing a configuration of an external device in the first embodiment of the present disclosure.

FIG. 4 is a block diagram showing a configuration of an air-conditioning control system and a cloud server in a first embodiment of the present disclosure. FIG. 5 is a block diagram showing a configuration of an air-conditioning apparatus in the first embodiment of the present disclosure. FIG. 6 is a block diagram showing a configuration of an external device in the first embodiment of the present disclosure.

The air-conditioning control system includes an air-conditioning apparatus 10, a cloud server 20, an external device 30, a terminal device 40, and a weather information server 50. Note that part or all of components of the cloud server 20 belong to one of a cloud server of a data center operating company and a server of a service provider. The air-conditioning control system does not need to include the terminal device 40 and the weather information server 50.

First, the configuration of the external device 30 will be described.

The external device 30 is, for example, a remote controller for remotely controlling the air-conditioning apparatus 10 with an infrared signal. The external device 30 is disposed near a user. Note that the external device 30 may be a smartphone, a tablet computer, or an artificial intelligence (AI) speaker. The external device 30 is communicatively connected to the cloud server 20, for example, over a network such as the Internet.

The external device 30 includes a control unit 31, a sensor 32, a storage unit 33, and a communication unit 34.

The control unit 31 is, for example, a processor and includes a communication control unit 311. The communication control unit 311 controls the communication unit 34, transmits various information items to the cloud server 20 via the communication unit 34, and receives various information items from the cloud server 20 via the communication unit 34. Also, the communication control unit 311 determines a frequency at which to transmit information to the cloud server 20.

The sensor 32 is mounted in the external device 30 and measures a first sensor value. The sensor 32 includes, for example, a temperature sensor that measures a temperature or a humidity sensor that measures humidity. The first sensor value includes, for example, at least one of a temperature near the external device 30, humidity near the external device 30, and a quantity of particulate matter (PM) near the external device 30. The particulate matter is, for example, pollen or PM 2.5. The sensor 32 measures the first sensor value regularly. The sensor 32 corresponds to one example of the first sensor device.

The storage unit 33 is, for example, a nonvolatile semiconductor memory and includes a first sensor value storage unit 331. The first sensor value storage unit 331 stores the first sensor value measured by the sensor 32 after the first sensor value is transmitted by a first sensor value transmission unit 341 until the next first sensor value is transmitted. The communication control unit 311 acquires the first sensor value from the sensor 32, and stores the first sensor value in the first sensor value storage unit 331.

The communication unit 34 includes the first sensor value transmission unit 341. The first sensor value transmission unit 341 transmits the first sensor value measured by the sensor 32 to the cloud server 20 at a first frequency. At this time, the first sensor value transmission unit 341 transmits the first sensor value stored in the first sensor value storage unit 331 to the cloud server 20.

Next, the configuration of the air-conditioning apparatus 10 will be described.

The air-conditioning apparatus 10 adjusts an indoor air quality environment. The air-conditioning apparatus 10 is communicatively connected to the cloud server 20, for example, over a network such as the Internet.

The air-conditioning apparatus 10 includes a control unit 11, a sensor 12, and a communication unit 13. The control unit 11 is, for example, a processor and includes a communication control unit 111 and an air-conditioning control unit 112. The communication unit 13 includes a second sensor value transmission unit 131, a control information transmission unit 132, a prediction information reception unit 133, and a parameter reception unit 134.

The communication control unit 111 controls the communication unit 13, transmits various information items to the cloud server 20 via the communication unit 13, and receives various information items from the cloud server 20 via the communication unit 13. Also, the communication control unit 111 determines a frequency at which to transmit information to the cloud server 20.

The air-conditioning control unit 112 adjusts a temperature or humidity of indoor air. Specifically, the air-conditioning control unit 112 is an air-conditioning function of the air-conditioning apparatus 10. However, the air-conditioning control unit 112 is not limited to this air-conditioning function as long as the air-conditioning control unit 112 is a control mechanism for controlling a temperature or humidity of a room. The parameter reception unit 134 receives an operating parameter transmitted from the cloud server 20. The air-conditioning control unit 112 controls the air-conditioning apparatus 10 based on the operating parameter received by the parameter reception unit 134.

The operating parameter is specified by an air-conditioning setting unit 232 to be described later. Examples of the operating parameter include operation status information indicating ON/OFF of operations, set mode information indicating a set mode of the air-conditioning apparatus such as cooling, heating, dehumidification, and automatic operation, information indicating a target set temperature at the external device to be specified for the air-conditioning apparatus, information indicating an airflow rate to be discharged by the air-conditioning apparatus, information indicating an airflow direction to be discharged by the air-conditioning apparatus, and room temperature sensor type information indicating a type of room temperature sensor to be used for determining a control level of air-conditioning control. The room temperature sensor type information is information indicating which of the following two types of temperature data to use: internal temperature data acquired by the sensor 12, and external temperature data notified by the prediction information reception unit 133.

The sensor 12 is mounted in the air-conditioning apparatus 10 and measures a second sensor value. Examples of the sensor 12 include a temperature sensor that measures an indoor temperature, a humidity sensor that measures indoor humidity, a temperature sensor that measures an outdoor temperature, a humidity sensor that measures outdoor humidity, a temperature sensor that measures a temperature at a blow-off nozzle, a motion sensor such as an infrared sensor that outputs information indicating whether there is any person, and an electric power sensor that measures electric energy from an electric current while the air-conditioning apparatus is operating. Examples of the second sensor value include an indoor temperature, indoor humidity, an outdoor temperature, outdoor humidity, a blow-off temperature, information indicating whether there is any person in the room, and electric energy. Note that the second sensor value may include at least one of a temperature near the air-conditioning apparatus 10, humidity near the air-conditioning apparatus 10, and a quantity of particulate matter near the air-conditioning apparatus 10. The communication control unit 111 acquires the second sensor value from the sensor 12, and outputs the second sensor value to the second sensor value transmission unit 131. The sensor 12 corresponds to one example of the second sensor device.

Note that in the present first embodiment, the air-conditioning apparatus 10 includes the sensor 12, but the present disclosure is not particularly limited to this example. The air-conditioning apparatus 10 may not include the sensor 12, and the sensor 12 may be provided outside the air-conditioning apparatus 10.

The second sensor value transmission unit 131 transmits the second sensor value measured by the sensor 12 to the cloud server 20 at a second frequency higher than a first frequency.

The control information transmission unit 132 acquires air-conditioning control information from the air-conditioning control unit 112, and transmits the air-conditioning control information to the cloud server 20. The air-conditioning control information indicates details of control to be performed by the air-conditioning control unit 112. Specifically, examples of the air-conditioning control information include operation status information indicating ON/OFF of operations, set mode information indicating a set mode of the air-conditioning apparatus such as cooling, heating, dehumidification or automatic, an indoor target set temperature, an airflow direction, an airflow rate, and the number of revolutions of a compressor (cooling or heating level).

The prediction information reception unit 133 receives, from the cloud server 20, the first sensor predicted value generated from the second sensor value based on a correlation between the first sensor value and the second sensor value. The air-conditioning control unit 112 controls the operation of the air-conditioning apparatus 10 by using the first sensor predicted value.

Next, the configuration of the cloud server 20 will be described.

The cloud server 20 includes a communication unit 21, a storage unit 22, and a control unit 23. The communication unit 21 includes a first sensor value acquisition unit 211, a second sensor value acquisition unit 212, a control information acquisition unit 213, a weather information acquisition unit 214, a prediction information transmission unit 215, a setting information receiving unit 216, and a parameter transmission unit 217. The storage unit 22 is, for example, a hard disk drive and includes a history database (DB) 221 and a prediction result DB 222. The control unit 23 is, for example, a processor and includes an indoor environment prediction unit 231 and an air-conditioning setting unit 232.

The first sensor value acquisition unit 211 acquires the first sensor value measured by the sensor 32 of the external device 30 at the first frequency. The first sensor value includes the temperature and humidity measured by the sensor 32. The first sensor value acquisition unit 211 receives the first sensor value transmitted from the external device 30, and stores the received first sensor value in the history DB 221. The first sensor value transmission unit 341 uploads the first sensor value regularly to the first sensor value acquisition unit 211 over a network such as the Internet. The data communication frequency from the external device 30 to the cloud server 20 (first frequency) is lower than the data communication frequency from the air-conditioning apparatus 10 to the cloud server 20 (second frequency). For example, when the data communication frequency from the air-conditioning apparatus 10 to the cloud server 20 is once per minute, the data communication frequency from the external device 30 to the cloud server 20 is once per 60 minutes.

The second sensor value acquisition unit 212 acquires the second sensor value measured by the sensor 12 of the air-conditioning apparatus 10 at the second frequency higher than the first frequency. The second sensor value acquisition unit 212 receives the second sensor value transmitted from the air-conditioning apparatus 10, and stores the received second sensor value in the history DB 221. The second sensor value includes an indoor temperature, indoor humidity, an outdoor temperature, a blow-off temperature, electric energy, and presence/absence information. The second sensor value acquisition unit 212 acquires the second sensor value from the second sensor value transmission unit 131 over a network such as the Internet, for example, at a frequency of once per minute, and stores the second sensor value in the history DB 221. The second sensor value transmission unit 131 may regularly upload the second sensor value to the second sensor value acquisition unit 212.

The control information acquisition unit 213 acquires the air-conditioning control information indicating an operating state of the air-conditioning apparatus 10. The control information acquisition unit 213 receives the air-conditioning control information transmitted from the air-conditioning apparatus 10, and stores the received air-conditioning control information in the history DB 221. The air-conditioning control information includes the operation status information, the set mode information, the set temperature, the airflow rate, and the airflow direction. The control information acquisition unit 213 acquires the air-conditioning control information from the control information transmission unit 132 over a network such as the Internet, for example, at a frequency of once per minute, and stores the air-conditioning control information in the history DB 221. The control information transmission unit 132 may regularly upload the air-conditioning control information to the control information acquisition unit 213. Triggered by an event in which control is changed, the control information transmission unit 132 may upload the air-conditioning control information to the control information acquisition unit 213.

In the external device 30, the frequency at which data is acquired from the sensor 32 is higher than the frequency at which data is transmitted to the cloud server 20. Therefore, the first sensor value in a period from the last data transmission to the next data transmission is stored in the first sensor value storage unit 331 of the external device 30. During data transmission, the first sensor value transmission unit 341 reads data from the first sensor value storage unit 331 and transmits the data in the period together. For example, when acquiring the first sensor value from the sensor 32 at a frequency of once per minute and communicating with the cloud server 20 at a frequency of once per 60 minutes, the first sensor value transmission unit 341 transmits together the first sensor value stored in the first sensor value storage unit 331 (first sensor value from last transmission time to current time). Note that the sensor 32 may set a sensing frequency according to the communication frequency.

The weather information acquisition unit 214 acquires weather information indicating weather conditions outside a space in which the sensor 32 and the sensor 12 are installed. The weather information acquisition unit 214 receives the weather information in an area in which the air-conditioning apparatus 10 is present from the weather information server 50, and stores the weather information in the history DB 221. The weather information includes future weather prediction information or weather history information. The weather information server 50 is connected to the cloud server 20 communicatively with each other over a network such as the Internet. The weather information server 50 transmits the weather information to the cloud server 20.

Note that the air-conditioning apparatus 10 and the external device 30 are installed at different positions in the identical space. Therefore, the sensor 32 and the sensor 12 are installed at different positions in the identical space.

The communication frequency for the weather information acquisition unit 214 to acquire the weather information is the same as the communication frequency for the second sensor value acquisition unit 212 and the control information acquisition unit 213 to acquire information.

The history DB 221 is a database for storing the first sensor value acquired by the first sensor value acquisition unit 211, the second sensor value acquired by the second sensor value acquisition unit 212, the air-conditioning control information acquired by the control information acquisition unit 213, and the weather information acquired by the weather information acquisition unit 214. As a database format, a relational database using SQL or the like is common, but a database called NoSQL constituting data from a simple relationship such as Key-Value type database may be used.

FIG. 7 is a diagram showing one example of a table structure of the history DB in the first embodiment of the present disclosure. In the history DB 221, an ID is a unique ID for identifying each record. Time is time when each information is acquired. A second indoor temperature, the indoor humidity, the outdoor temperature, the blow-off temperature, the electric energy, and the presence/absence information are the second sensor value acquired through the second sensor value acquisition unit 212. The operation status, the set mode, the set temperature, the airflow rate, and the airflow direction are the air-conditioning control information acquired through the control information acquisition unit 213. The weather information is information indicating the weather of an area acquired through the weather information acquisition unit 214. A first indoor temperature is the first sensor value acquired through the first sensor value acquisition unit 211. Note that for easy description, the first sensor value, the second sensor value, and the air-conditioning control information are compiled in one table, but may be managed as separate tables.

Here, as described above, since the communication frequency of the first sensor value acquisition unit 211 is lower than the communication frequency of the second sensor value acquisition unit 212, the control information acquisition unit 213, and the weather information acquisition unit 214, the first sensor value is updated later than other data. For example, in an example of FIG. 7, the first sensor value is acquired at 10:01 on Aug. 14, 2016. In this case, the first sensor value until this time has been acquired, but the first sensor value after this time is not updated until the next data acquisition time (at 11:01 on Aug. 14, 2016 if the frequency is once per 60 minutes). Therefore, as in the example of FIG. 7, in and after ID 103, data other than the first sensor value is complete, but the first sensor value is unknown.

In a period in which the second sensor value, the air-conditioning control information, and the weather information are acquired and the first sensor value is not acquired, the indoor environment prediction unit 231 generates the first sensor predicted value from the second sensor value, the air-conditioning control information, and the weather information, based on a correlation among the first sensor value, the second sensor value, the air-conditioning control information, and the weather information. When the first sensor value is undetermined, the indoor environment prediction unit 231 uses the history DB 221 to predict the first sensor value by using the second sensor value acquired by the second sensor value acquisition unit 212, the air-conditioning control information acquired by the control information acquisition unit 213, and the weather information acquired by the weather information acquisition unit 214. The indoor environment prediction unit 231 stores predicted results in the prediction result DB 222. Note that the first sensor predicted value may include at least one of a predicted temperature near the external device 30, predicted humidity near the external device 30, and a predicted quantity of particulate matter near the external device 30.

The indoor environment prediction unit 231 generates the first sensor predicted value from the second sensor value, the air-conditioning control information, and the weather information, by using a prediction model based on the correlation among the first sensor value, the second sensor value, the air-conditioning control information, and the weather information.

The indoor environment prediction unit 231 makes a prediction using machine learning. Generally, machine learning is classified into two phases called a learning phase and an identification phase. In the learning phase, the indoor environment prediction unit 231 inputs training data, such as past historical data. Through data analysis, the indoor environment prediction unit 231 extracts a relationship of training data and creates the prediction model. The prediction model outputs a predicted value of unknown data based on a relationship of learned data. Then, in the identification phase, the indoor environment prediction unit 231 inputs identification data that is an input parameter for prediction into the prediction model. Based on the relationship of data extracted in the learning phase, the indoor environment prediction unit 231 outputs the predicted value from the prediction model. The parameter to predict is called a response variable, and the parameter used for learning in order to derive the response variable is called an explanatory variable.

Here, as training data, the indoor environment prediction unit 231 acquires the historical data of the history DB 221, performs learning, and generates the prediction model. As the historical data, data that has been registered with the history DB and includes data of all table columns including the first sensor value is acquired. For example, in the example of FIG. 7, data of all the columns up to ID 102 is complete, and thus the indoor environment prediction unit 231 acquires the data up to ID 102 and generates the prediction model. In this case, the response variable is the first sensor value, and the explanatory variable is the time, the first sensor value acquired from the first sensor value acquisition unit 211, the second sensor value acquired from the second sensor value acquisition unit 212, the air-conditioning control information acquired from the control information acquisition unit 213, and the weather information acquired from the weather information acquisition unit 214.

The indoor environment prediction unit 231 inputs data other than the first sensor value into the generated prediction model as the identification data. Thus, the indoor environment prediction unit 231 predicts the first sensor value at the time. For example, in the example of FIG. 7, the first sensor value in the record ID 103 is unknown. When predicting the first sensor value in the record ID 103, the indoor environment prediction unit 231 inputs, into the prediction model, the time of the record ID 103, the second sensor value acquired from the second sensor value acquisition unit 212, the air-conditioning control information acquired from the control information acquisition unit 213, and the weather information acquired from the weather information acquisition unit 214. Then, the indoor environment prediction unit 231 generates the first sensor predicted value.

Here, since processing cost of learning from the historical data is high, it is preferable to set the learning frequency at a low level. For example, it is preferable that the indoor environment prediction unit 231 learns the prediction model at the frequency at which to acquire the first sensor value from the external device 30. Meanwhile, it is preferable to set the prediction frequency at a high level because the processing cost of prediction using the prediction model is low. For example, it is preferable that the indoor environment prediction unit 231 predicts the first sensor value at timing at which the second sensor value acquisition unit 212 or the control information acquisition unit 213 stores data in the history DB 221.

When machine learning is performed, what kind of historical data to input as training data and what kind of historical data to input as identification data will be key points to increase prediction accuracy. As a learning algorithm, linear regression, neural network, or deep learning is used, but the learning algorithm is not limited here. As a cloud service for machine learning, the indoor environment prediction unit 231 may utilize a library or an application programming interface (API) for performing machine learning.

Note that in the present first embodiment, the indoor environment prediction unit 231 generates the first sensor predicted value from the second sensor value, the air-conditioning control information, and the weather information, based on the correlation among the first sensor value, the second sensor value, the air-conditioning control information, and the weather information; however, the present disclosure is not particularly limited to this example. In a period in which the second sensor value is acquired and the first sensor value is not acquired, the indoor environment prediction unit 231 may generate the first sensor predicted value from the second sensor value based on the correlation between the first sensor value and the second sensor value. At this time, the indoor environment prediction unit 231 generates the first sensor predicted value from the second sensor value, by using the prediction model based on the correlation between the first sensor value and the second sensor value. In this case, since the first sensor predicted value is generated from the second sensor value based on the correlation between the first sensor value and the second sensor value, the air-conditioning control information and the weather information become unnecessary.

Also, the indoor environment prediction unit 231 may generate the first sensor predicted value from the second sensor value and the air-conditioning control information based on the correlation among the first sensor value, the second sensor value, and the air-conditioning control information. At this time, the indoor environment prediction unit 231 generates the first sensor predicted value from the second sensor value and the air-conditioning control information, by using the prediction model based on the correlation among the first sensor value, the second sensor value, and the air-conditioning control information. In this case, the first sensor predicted value is generated from the second sensor value and the air-conditioning control information based on the correlation among the first sensor value, the second sensor value, and the air-conditioning control information. Therefore, the weather information becomes unnecessary.

Furthermore, the indoor environment prediction unit 231 may generate the first sensor predicted value from the second sensor value and the weather information based on the correlation among the first sensor value, the second sensor value, and the weather information. At this time, the indoor environment prediction unit 231 generates the first sensor predicted value from the second sensor value and the weather information, by using the prediction model based on the correlation among the first sensor value, the second sensor value, and the weather information. In this case, the first sensor predicted value is generated from the second sensor value and the weather information based on the correlation among the first sensor value, the second sensor value, and the weather information. Therefore, the air-conditioning control information becomes unnecessary.

The setting information receiving unit 216 is an external interface for receiving user input, for example, an external interface for performing communication by an http/https protocol (WebAPI). The setting information receiving unit 216 receives the setting information for the air-conditioning apparatus 10 that is input by a user from the terminal device 40, and outputs the setting information to the air-conditioning setting unit 232.

The terminal device 40 is, for example, a smartphone, a tablet computer, or a personal computer. The terminal device 40 is communicatively connected to the cloud server 20, for example, over a network such as the Internet. Note that the external device 30 and the terminal device 40 may be devices different from each other, or may be the same device. The setting information receiving unit 216 may transmit the prediction result generated by the indoor environment prediction unit 231 or the history information stored in the history DB 221 to the terminal device 40.

Figure 8:
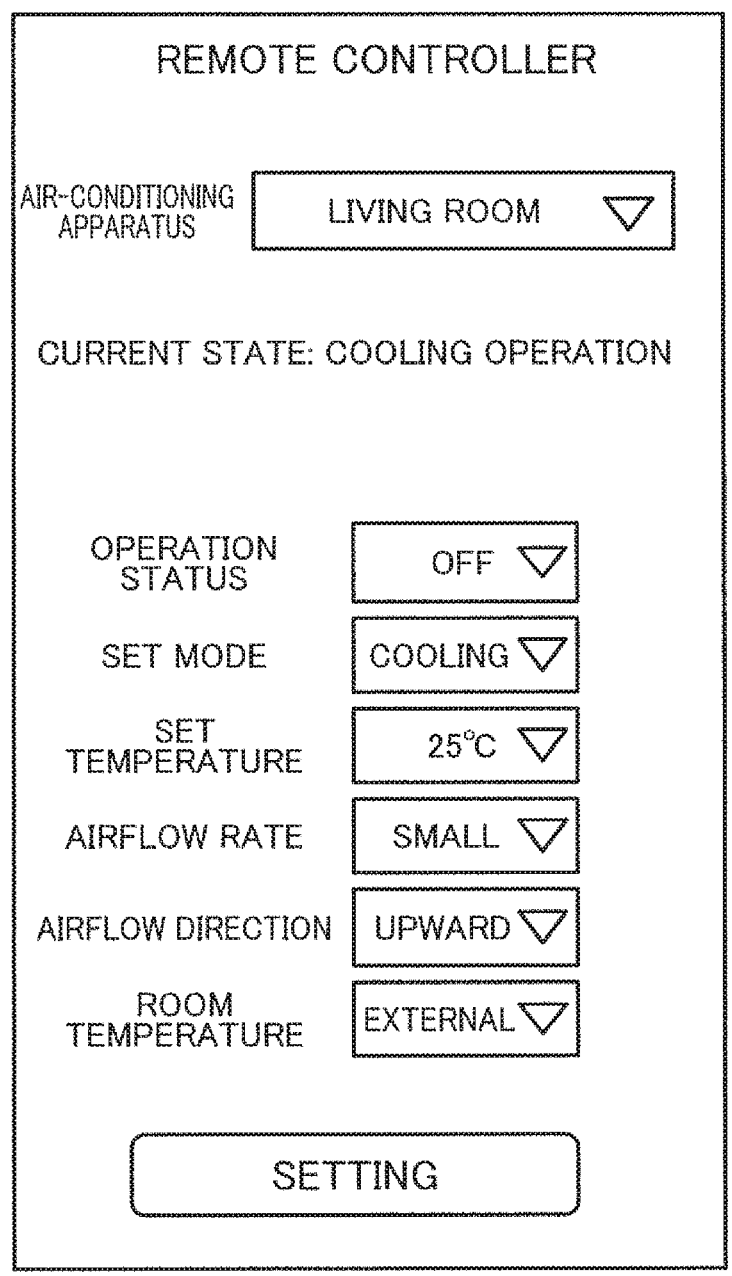
FIG. 8 is a diagram showing one example of a display screen to be displayed on a terminal device when the air-conditioning apparatus is remotely operated in the first embodiment of the present disclosure.

FIG. 8 is a diagram showing one example of a display screen to be displayed on the terminal device when the air-conditioning apparatus is remotely operated in the first embodiment of the present disclosure. The terminal device 40 displays a graphical user interface (GUI). FIG. 8 shows an example in which the air-conditioning apparatus is to be controlled. When there is a plurality of air-conditioning apparatuses, the air-conditioning apparatus to be controlled can be selected from a pulldown menu. In FIG. 8, the air-conditioning apparatus installed in a living room is selected. The terminal device 40 displays the current state of the air-conditioning apparatus, and the setting information receiving unit 216 acquires data of the latest setting state of the air-conditioning apparatus from the history DB 221, and displays the current state of the air-conditioning apparatus. FIG. 8 displays the current state of the air-conditioning apparatus as "cooling operation".

The item of operation status receives selection of one of ON and OFF of the air-conditioning apparatus. The item of set mode receives selection of one of cooling, heating, dehumidification, and automatic operation. The item of set temperature receives selection of a target temperature specified for the air-conditioning apparatus, the target temperature being measured by the external device 30. The item of airflow rate receives setting of the airflow rate to be discharged from the air-conditioning apparatus. The item of airflow direction receives the airflow direction to be discharged from the air-conditioning apparatus. The item of room temperature receives selection of the type of sensor that measures the indoor temperature. For example, the item of room temperature receives selection of one of the sensor included in the external device and the sensor included in the air-conditioning apparatus. The user selects which of the temperature measured by the sensor included in the external device and the temperature measured by the sensor included in the air-conditioning apparatus to use for controlling the air-conditioning apparatus. Through pressing of a setting button, the terminal device 40 converts the setting information that is input by GUI into a format of the http/https protocol, and then notifies the setting information receiving unit 216.

Based on the setting information received by the setting information receiving unit 216, the air-conditioning setting unit 232 generates the operating parameter to control the air-conditioning apparatus 10, and transmits the generated operating parameter to the air-conditioning apparatus 10.

The prediction information transmission unit 215 acquires the first sensor predicted value of the external device 30 from the prediction result DB 222, and then regularly transmits the first sensor predicted value to the air-conditioning apparatus 10.

In the present embodiment, the prediction model learned using the history information stored in the history DB 221 is created, the indoor temperature measured by the external device 30 using the prediction model is predicted at a high frequency, and the predicted value is used for air-conditioning control. Such a configuration enables prediction of the indoor temperature measured by the external device 30, regardless of the data acquisition frequency of the first sensor value acquisition unit 211. This allows reduction in the communication frequency from the external device 30 and allows reduction in the power consumption of the external device 30.

In the prediction processing of the present embodiment, indoor temperature measurement values measured by the external device 30 in the past are not used as the explanatory variable. With this configuration, the prediction accuracy does not depend on the acquisition frequency of the indoor temperature by the external device 30. Therefore, when the prediction accuracy is high, the acquisition frequency of the indoor temperature by the external device 30 can be lowered.

Note that in the present embodiment, the indoor environment prediction unit 231 may use past time-series data of the first sensor value of the external device 30 as the explanatory variable.

FIG. 9 is a diagram showing a modification of a data structure of the history DB in the first embodiment of the present disclosure. For example, as shown in FIG. 9, the indoor environment prediction unit 231 may use the first sensor value of the external device 30 of 10 minutes before as the learned data. Note that when the first sensor value of 10 minutes ago has not been stored, the indoor environment prediction unit 231 may use the first sensor predicted value of 10 minutes ago. That is, the indoor environment prediction unit 231 may perform machine learning of the prediction model by using the first sensor value, the second sensor value, the air-conditioning control information, the weather information, and the first sensor predicted value. Also, the indoor environment prediction unit 231 may perform machine learning of the prediction model by using the first sensor value, the second sensor value, and the first sensor predicted value. With such a configuration, a relationship of time-series data change is reflected on the prediction model, and thus prediction accuracy can be improved.

Note that the second sensor value shown in FIG. 9 may include electric energy of the air-conditioning apparatus 10.

Next, an air-conditioning control method by the air-conditioning control system in the present embodiment will be described. The air-conditioning control processing by the air-conditioning control system in the present embodiment includes data transmission processing by the air-conditioning apparatus, data transmission processing by the external device, learning processing by the cloud server, prediction processing by the cloud server, and air-conditioning setting processing by the cloud server.

FIG. 10 is a flowchart showing one example of the data transmission processing by the air-conditioning apparatus in the first embodiment of the present disclosure.

First, in step S1, the communication control unit 111 of the air-conditioning apparatus 10 acquires the second sensor value including the indoor temperature, the indoor humidity, the outdoor temperature, the blow-off temperature, the electric energy, and the presence/absence information from the sensor 12.

Next, in step S2, the control information transmission unit 132 of the air-conditioning apparatus 10 acquires the air-conditioning control information including the operation status, the set mode, the set temperature, the airflow rate, and the airflow direction from the air-conditioning control unit 112.

Next, in step S3, the second sensor value transmission unit 131 transmits the second sensor value to the cloud server 20. The second sensor value acquisition unit 212 of the cloud server 20 receives the second sensor value transmitted from the air-conditioning apparatus 10, and stores the received second sensor value in the history DB 221.

Next, in step S4, the control information transmission unit 132 transmits the air-conditioning control information to the cloud server 20. The control information acquisition unit 213 of the cloud server 20 receives the air-conditioning control information transmitted from the air-conditioning apparatus 10, and stores the received air-conditioning control information in the history DB 221.

Next, in step S5, the communication control unit ill determines whether a predetermined time has elapsed after transmitting the second sensor value and the air-conditioning control information. The predetermined time is 1 minute, for example. When it is determined here that the predetermined time has not elapsed (NO in step S5), the communication control unit 111 waits until the predetermined time elapses. Note that during the wait, a processor load may be decreased to reduce power consumption.

On the other hand, when it is determined that the predetermined time has elapsed (YES in step S5), the process returns to step S1. Note that the predetermined time is set according to the transmission frequency at which the second sensor value is transmitted. When the transmission frequency is once per minute, the communication control unit 111 sets the predetermined time at 1 minute.

When a communication path with the cloud server 20 is established and the power is on, the data transmission processing is always performed. In this way, all of indoor environmental information and the setting information of the air-conditioning apparatus are stored in the database. In FIG. 10, the acquisition processing of the second sensor value and the acquisition processing of the air-conditioning control information are performed sequentially, but both processing may be performed in parallel. The acquisition processing of the air-conditioning control information may not be performed regularly, but may be performed at timing at which the air-conditioning control information is changed.

FIG. 11 is a flowchart showing one example of the data transmission processing by the external device in the first embodiment of the present disclosure.

First, in step S11, the communication control unit 311 of the external device 30 acquires the first sensor value including the indoor temperature and the indoor humidity from the sensor 32.

Next, in step S12, the communication control unit 311 stores the acquired first sensor value in the first sensor value storage unit 331.

Next, in step S13, the communication control unit 311 determines whether it is timing to transmit the first sensor value to the cloud server 20. For example, when transmitting the first sensor value to the cloud server 20 once per hour, the communication control unit 311 compares the last transmission time with the current time to determine whether a predetermined time has elapsed since the last transmission time. The predetermined time is 1 hour, for example. When the predetermined time has elapsed since the last transmission time, the communication control unit 311 determines that it is timing to transmit the first sensor value to the cloud server 20. When the predetermined time has not elapsed since the last transmission time, the communication control unit 311 determines that it is not timing to transmit the first sensor value to the cloud server 20. Note that the predetermined time is set according to the transmission frequency at which the first sensor value is transmitted. When the transmission frequency is once per hour, the communication control unit 311 sets the predetermined time at 1 hour.

Here, when it is determined that it is not timing to transmit the first sensor value to the cloud server 20 (NO in step S13), the process proceeds to step S17.

On the other hand, when it is determined that it is timing to transmit the first sensor value to the cloud server 20 (YES in step S13), in step S14, the first sensor value transmission unit 341 transmits the first sensor value stored in the first sensor value storage unit 331 to the cloud server 20. The first sensor value acquisition unit 211 of the cloud server 20 receives the first sensor value transmitted from the external device 30, and stores the received first sensor value in the history DB 221.

Next, in step S15, the communication control unit 311 deletes the first sensor value from the first sensor value storage unit 331.

Next, in step S16, the communication control unit 311 stores a transmission result in the storage unit 33. The transmission result is information to be used for determination of transmission timing of step S13. For example, the transmission result includes the time when the first sensor value is transmitted.

Next, in step S17, the communication control unit 311 determines whether the predetermined time has elapsed after acquiring the first sensor value last time. The predetermined time is 1 minute, for example. When it is determined here that the predetermined time has not elapsed (NO in step S17), the process returns to step S13. On the other hand, when it is determined that the predetermined time has elapsed (YES in step S17), the process returns to step S1. Note that the predetermined time is set according to the acquisition frequency at which the first sensor value is acquired from the sensor 32. When the acquisition frequency is once per minute, the communication control unit 311 sets the predetermined time at 1 minute.

Figure 12:
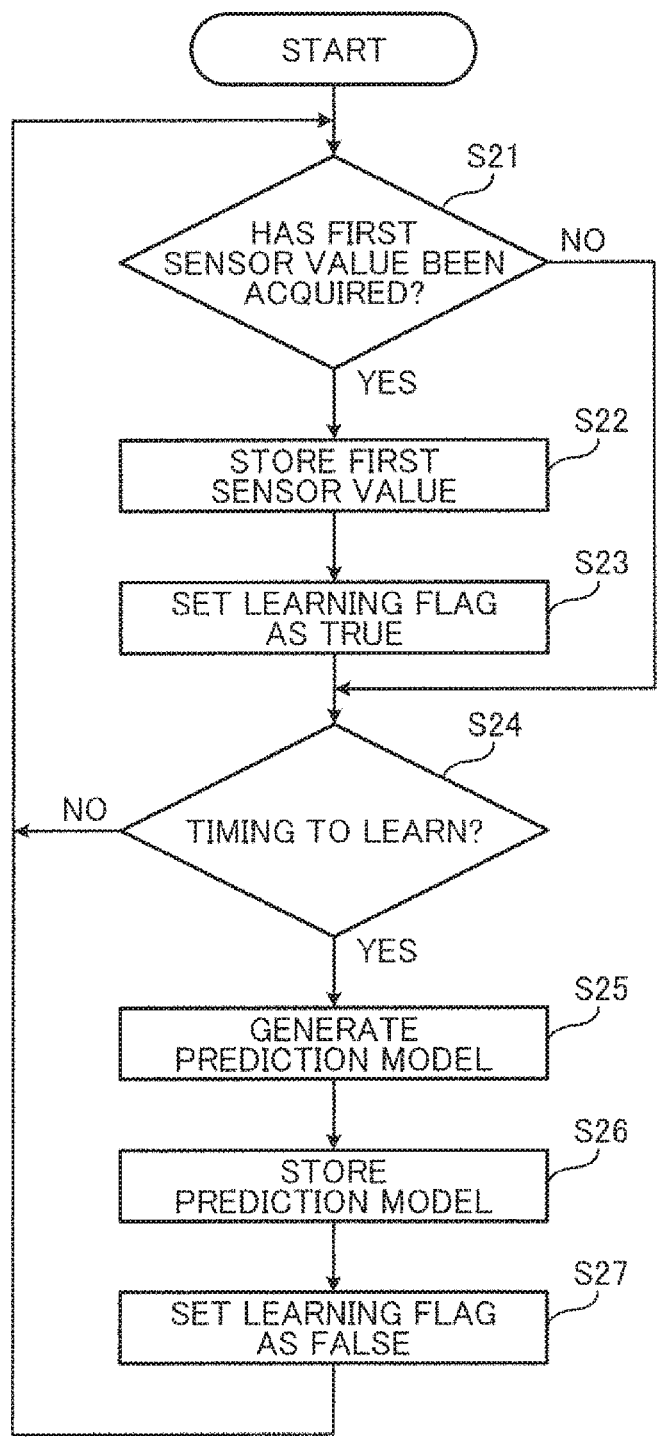
FIG. 12 is a flowchart showing one example of learning processing by the cloud server in the first embodiment of the present disclosure.

FIG. 12 is a flowchart showing one example of the learning processing by the cloud server in the first embodiment of the present disclosure.

First, in step S21, the indoor environment prediction unit 231 of the cloud server 20 determines whether the first sensor value acquisition unit 211 has acquired the first sensor value transmitted from the external device 30. Here, when it is determined that the first sensor value has not been acquired (NO in step S21), the process proceeds to step S24.

On the other hand, when it is determined that the first sensor value has been acquired (YES in step S21), in step S22, the first sensor value acquisition unit 211 stores the acquired first sensor value in the history DB 221.

Next, in step S23, the indoor environment prediction unit 231 sets a learning flag to be used for determination whether to update the prediction model as TRUE.

Next, in step S24, the indoor environment prediction unit 231 determines whether it is timing to learn the prediction model. For example, when the prediction model is learned at timing at which the first sensor value is uploaded from the external device 30, the learning flag is set as TRUE at timing at which the first sensor value acquisition unit 211 stores the first sensor value in the history DB 221. When the learning flag is set as TRUE, the indoor environment prediction unit 231 determines that it is timing to learn, whereas when the learning flag is set as FALSE, the indoor environment prediction unit 231 determines that it is not timing to learn. Here, when it is determined that it is not timing to learn (NO in step S24), the process returns to step S21.

On the other hand, when it is determined that it is timing to learn (YES in step S24), in step S25, the indoor environment prediction unit 231 acquires the first sensor value, the second sensor value, the air-conditioning control information, and the weather information from the history DB 221, learns the acquired first sensor value, the second sensor value, the air-conditioning control information, and the weather information, and then generates the prediction model. At this time, data of which period to use for learning may be determined by a relationship between prediction accuracy and processing time, and it is preferable to use immediately preceding data because prediction accuracy is improved.

Next, in step S26, the indoor environment prediction unit 231 stores the prediction model in the storage unit 22.

Next, in step S27, the indoor environment prediction unit 231 sets the learning flag as FALSE. After the process of step S27 is performed, the process proceeds to step S21.

Figure 13:
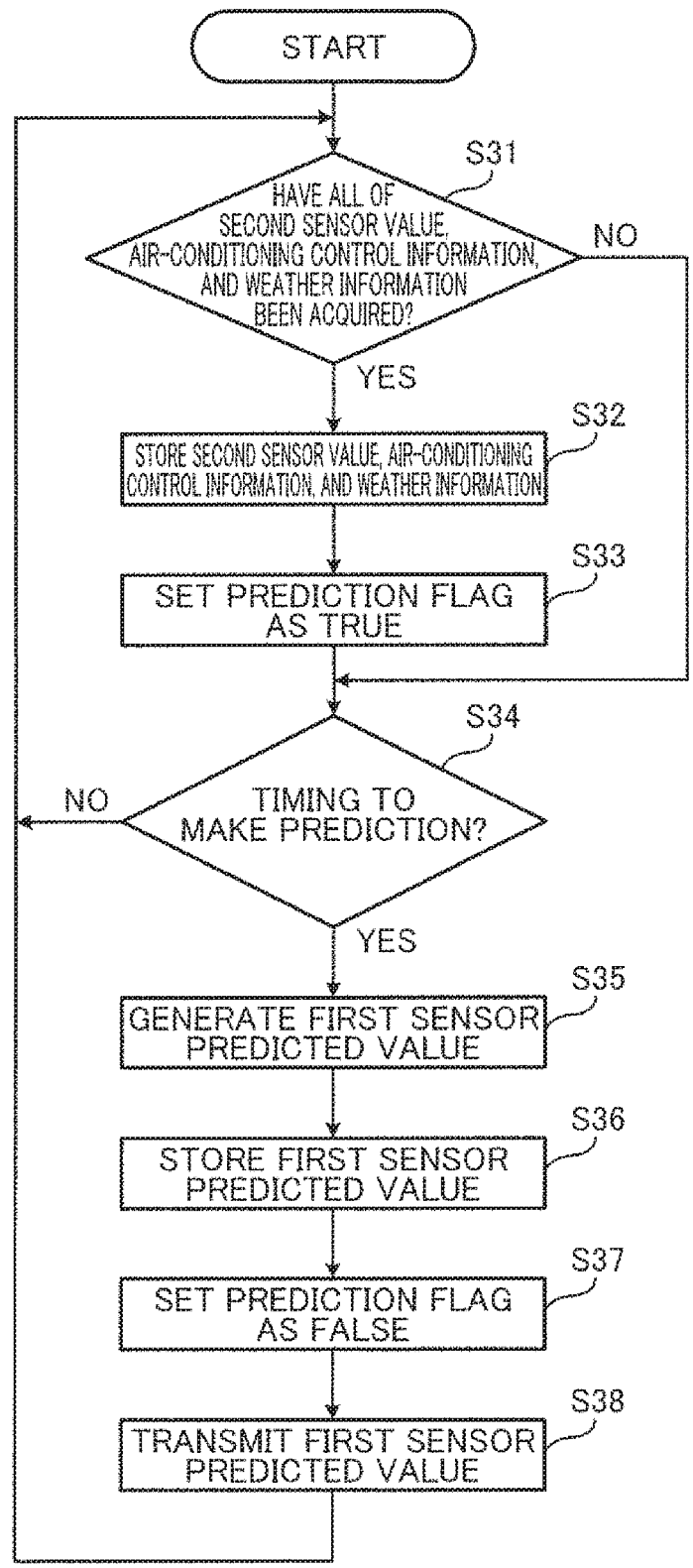
FIG. 13 is a flowchart showing one example of prediction processing by the cloud server in the first embodiment of the present disclosure.

FIG. 13 is a flowchart showing one example of the prediction processing by the cloud server in the first embodiment of the present disclosure.

First, in step S31, the indoor environment prediction unit 231 of the cloud server 20 determines whether the second sensor value acquisition unit 212 has acquired the second sensor value transmitted from the air-conditioning apparatus 10, the control information acquisition unit 213 has acquired the air-conditioning control information transmitted from the air-conditioning apparatus 10, and the weather information acquisition unit 214 has acquired the weather information transmitted from the weather information server 50. Here, when it is determined that all of the second sensor value, the air-conditioning control information, and the weather information have not been acquired (NO in step S31), the process proceeds to step S34. Then, the indoor environment prediction unit 231 performs determination processing of step S34 and step S31 until all the second sensor value, the air-conditioning control information, and the weather information are acquired.

On the other hand, when it is determined that all the second sensor value, the air-conditioning control information, and the weather information have been acquired (YES in step S31), in step S32, the second sensor value acquisition unit 212, the control information acquisition unit 213, and the weather information acquisition unit 214 store the acquired second sensor value, the air-conditioning control information, and the weather information in the history DB 221, respectively.

Next, in step S33, the indoor environment prediction unit 231 sets a prediction flag to be used for determination whether to calculate the first sensor predicted value as TRUE.

Next, in step S34, the indoor environment prediction unit 231 determines whether it is timing to predict the first sensor value. For example, when the first sensor value is predicted at timing at which all data to be used for prediction is acquired by the second sensor value acquisition unit 212, the control information acquisition unit 213, and the weather information acquisition unit 214, the prediction flag is set as TRUE at timing at which the second sensor value acquisition unit 212, the control information acquisition unit 213, and the weather information acquisition unit 214 store the second sensor value, the air-conditioning control information, and the weather information in the history DB 221, respectively. When the prediction flag is set as TRUE, the indoor environment prediction unit 231 determines that it is timing to make a prediction, whereas when the prediction flag is set as FALSE, the indoor environment prediction unit 231 determines that it is not timing to make a prediction. Here, when it is determined that it is not timing to make a prediction (NO in step S34), the process returns to step S31.

On the other hand, when it is determined that it is timing to make a prediction (YES in step S34), in step S35, the indoor environment prediction unit 231 generates the first sensor predicted value that predicts the first sensor value of the external device 30 by using the prediction model generated by the learning processing. The indoor environment prediction unit 231 reads the second sensor value, the air-conditioning control information, and the weather information at a time to make a prediction from the history DB 221. The indoor environment prediction unit 231 then inputs, into the prediction model, the read second sensor value, the air-conditioning control information, and the weather information as identification data. From the prediction model, the first sensor predicted value at the time to make a prediction is output.

Next, in step S36, the indoor environment prediction unit 231 stores the first sensor predicted value in the prediction result DB 222.

Next, in step S37, the indoor environment prediction unit 231 sets the prediction flag as FALSE.

Next, in step S38, the prediction information transmission unit 215 reads the first sensor predicted value from the prediction result DB 222, and transmits the read first sensor predicted value to the air-conditioning apparatus 10. After the process of step S38 is performed, the process proceeds to step S31.

Figure 14:
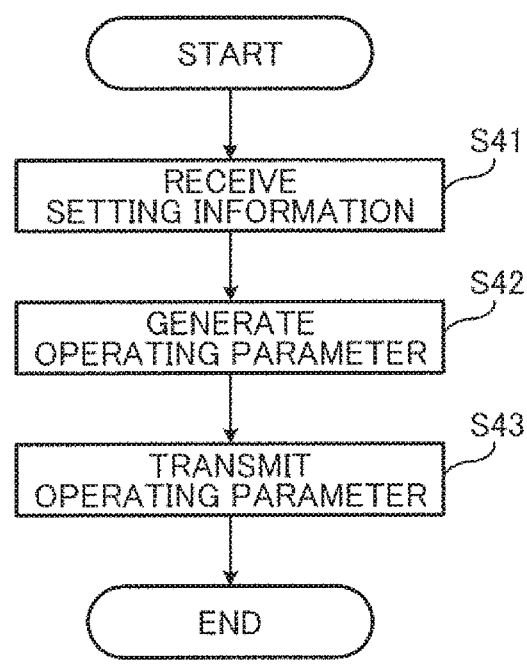
FIG. 14 is a flowchart showing one example of air-conditioning setting processing by the cloud server in the first embodiment of the present disclosure.

FIG. 14 is a flowchart showing one example of the air-conditioning setting processing by the cloud server in the first embodiment of the present disclosure.

First, in step S41, the setting information receiving unit 216 receives the setting information of the air-conditioning apparatus 10 transmitted from the terminal device 40. The terminal device 40 transmits the setting information including the operation status, the set mode, the set temperature, the airflow rate, and the airflow direction desired by a user to the cloud server 20.

Next, in step S42, the air-conditioning setting unit 232 generates the operating parameter for operating the air-conditioning apparatus 10 according to the received setting information.

Next, in step S43, the parameter transmission unit 217 transmits the operating parameter to the air-conditioning apparatus 10. The parameter reception unit 134 of the air-conditioning apparatus 10 receives the operating parameter transmitted from the cloud server 20. Then, the air-conditioning control unit 112 of the air-conditioning apparatus 10 controls the operation of the air-conditioning apparatus 10 according to the operating parameter received by the parameter reception unit 134.

Note that in the present embodiment, when the external device 30 is turned off, the air-conditioning setting unit 232 may generate the operating parameter of the air-conditioning apparatus 10 by using the first sensor predicted value that predicts the first sensor value of the external device 30. When sufficient data is stored in the history DB 221 and the prediction model is created based on this data, the indoor environment prediction unit 231 can predict the first sensor value measured by the external device 30 even without communication with the external device 30. With such a configuration, even if the external device 30 is not disposed, air-conditioning control according to an environment of a place near a person can be performed.

Also, in the present embodiment, the indoor environment prediction unit 231 may receive a user's setting of whether to learn the prediction model. For example, the external device 30 may include a learning execution button for inputting whether to execute learning of the prediction model. The indoor environment prediction unit 231 uses only data that is communicated only when the learning execution button is turned on for learning the prediction model. In this way, by turning on the learning execution button only when the external device 30 is at a position at which the user desires to execute learning and turning off the learning execution button when the external device 30 is at a position at which the user does not desire to execute learning, the user can specify the position of the external device 30 to make a prediction.

When the external device 30 in the present embodiment is a remote controller for the air-conditioning apparatus 10, the external device 30 may communicate with the air-conditioning apparatus 10 with a remote control signal, and transmit data from the external device 30 to the cloud server 20 by using the communication path between the air-conditioning apparatus 10 and the cloud server 20. Such a configuration eliminates the need for the external device 30 to include a communication function other than an infrared communication function.

Also, in the present embodiment, as shown in FIG. 7, examples of the learning parameter of the indoor environment prediction unit 231 include the indoor temperature, the indoor humidity, the outdoor temperature, the blow-off temperature, the electric energy, the presence/absence information, the operation status, the set mode, the set temperature, the airflow rate, the airflow direction, and the weather information. However, the learning parameter is not limited to the above-described examples and may include any information as long as the information has a correlation with the first sensor value of the external device 30 (indoor temperature). For example, characteristics of a person's going in and out of a room and the length of a person's stay in a room are reflected on the prediction model by information regarding a day of the week and public holiday. Parameters indicating a cooling and heating level of the air-conditioning apparatus 10 include the number of revolutions of a compressor or a blow-off airflow rate. By using the quantity of indoor carbon dioxide, it is possible to grasp more accurately whether a person is present and an amount of activity of the person. Information regarding opening and closing of a window makes it possible to follow a change in heat-insulating properties of a room. Furthermore, an amount of solar radiation, which affects the indoor temperature change, is effective.

The present embodiment illustrates the indoor temperature near the external device 30 as the response variable of the prediction model to be used by the indoor environment prediction unit 231, but it is needless to say that the response variable in the present disclosure is not limited to the indoor temperature. For example, the first sensor value having a correlation with the second sensor value that can be measured by the air-conditioning apparatus 10 and the air-conditioning control information, such as humidity, the quantity of carbon dioxide, or an amount of solar radiation, can be applied as the response variable. Furthermore, for example, if the sensor 32 of the external device 30 measures a quantity of particulate matter, such as PM 2.5 or pollen, and the sensor 12 of the air-conditioning apparatus 10 similarly measures the quantity of particulate matter, such as PM 2.5 or pollen, it is also possible to use air quality information the sensor 32 of the external device 30 measures as the response variable.

The external device 30 in the present embodiment may be a remote controller that performs infrared communication with the air-conditioning apparatus 10. In order to implement this configuration, the external device 30 includes an infrared communication unit that performs infrared communication. The infrared communication unit can communicate with the air-conditioning apparatus 10, transmit the setting information to the air-conditioning apparatus 10, and control the air-conditioning apparatus 10. When the air-conditioning apparatus 10 is controlled by using the external device 30, it is possible to store information about the control in the storage unit 33 of the external device 30, and the information about the control can be used for a communication method or communication frequency of the external device 30. For example, when the air-conditioning apparatus 10 is turned off, the external device 30 stops transmission of the first sensor value, whereas only when the air-conditioning apparatus 10 is turned on, the external device 30 transmits the first sensor value, thereby preventing unnecessary communication in a season or period in which the air-conditioning apparatus 10 is not used.

The external device 30 in the present embodiment may not be the remote controller that remotely operates the air-conditioning apparatus 10. In this case, methods for the external device 30 to detect that the air-conditioning apparatus 10 is turned on include a method for using information from the cloud server 20 and characteristics of a change in the first sensor value measured by the external device 30.

Figure 15:
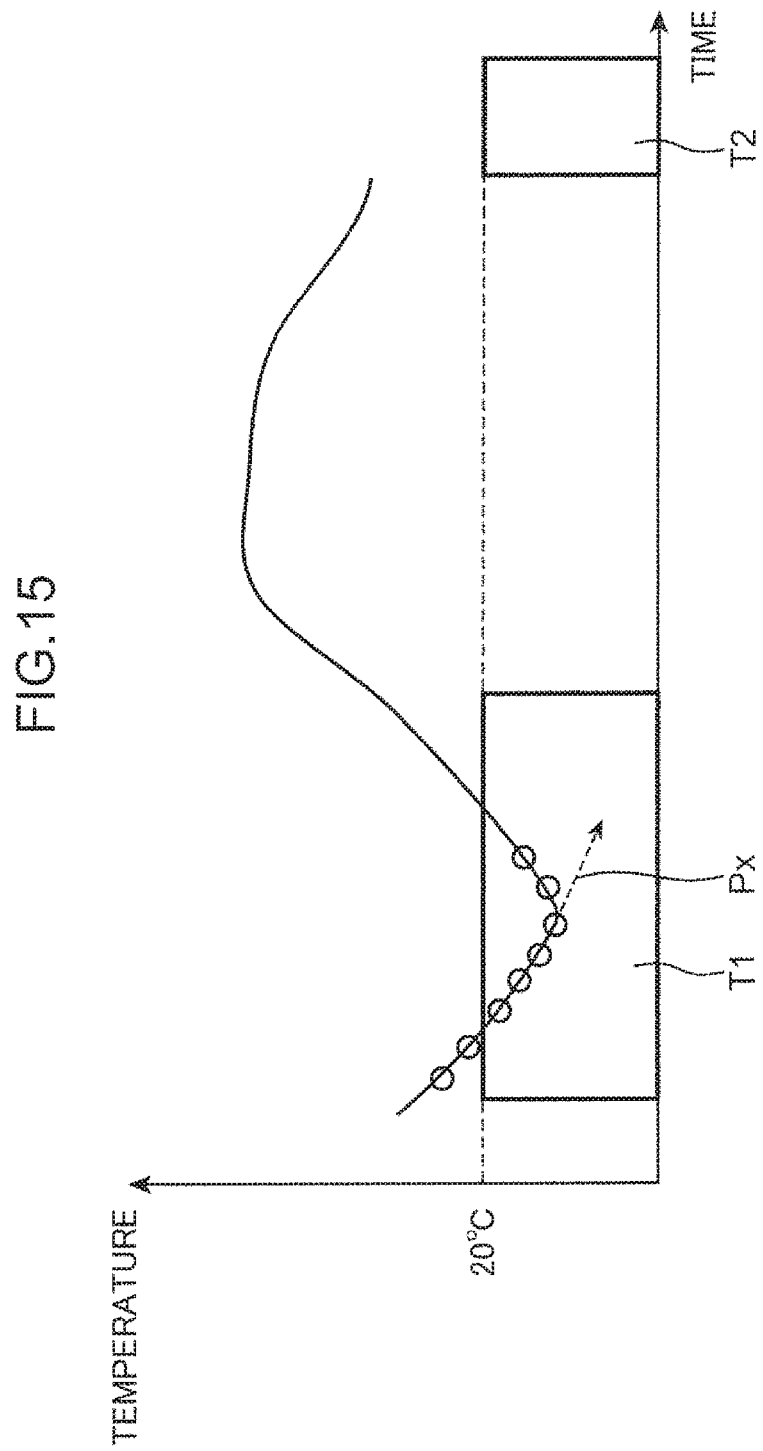
FIG. 15 is a diagram for describing processing for the external device to determine on-timing of the air-conditioning apparatus in the first embodiment of the present disclosure.

FIG. 15 is a diagram for describing processing for the external device to determine on-timing of the air-conditioning apparatus in the first embodiment of the present disclosure. For example, FIG. 15 shows a graph of a temperature change in the indoor temperature the external device 30 measures when the air-conditioning apparatus 10 is operated for heating. Using information stored in the history DB 221, the cloud server 20 specifies areas T1 and T2 indicating time zones and temperature zones in which the air-conditioning apparatus 10 is operated for heating on a coordinate space with the time plotted on the horizontal axis and the temperature plotted on the vertical axis. The cloud server 20 then transmits information regarding the areas T1 and T2 to the external device 30 as a return value of the transmission of the first sensor value (indoor temperature) by the external device 30.

In the areas T1 and T2 indicating the time zones and the temperature zones in which the air-conditioning apparatus 10 is operated for heating, when the current measured temperature is higher than a predicted temperature on a predicted temperature change Px predicted (linearly interpolated) from a plurality of temperatures measured in the past by a temperature equal to or higher than a predetermined threshold, the external device 30 transmits the first sensor value to the cloud server 20. Such a configuration allows minimization of the communication frequency and estimation of timing at which the air-conditioning apparatus 10 is turned on.

Also, timing at which the air-conditioning apparatus 10 is turned off can be estimated by a similar method. The external device 30 receives, from the cloud server 20, an area indicating a time zone and a temperature zone in which the heating operation of the air-conditioning apparatus 10 is stopped. When the current measured temperature is lower than the predicted temperature on the predicted temperature change Px predicted (linearly interpolated) from the plurality of temperatures measured in the past by the temperature equal to or lower than the predetermined threshold in the area, the external device 30 transmits the first sensor value to the cloud server 20. When the air-conditioning apparatus 10 is operated for cooling, the external device 30 can detect on and off of the power of the air-conditioning apparatus 10 similarly.

The timing at which the first sensor value acquisition unit 211 in the present embodiment acquires the first sensor value from the external device 30 is not limited to the above-described timing.

Figure 16:
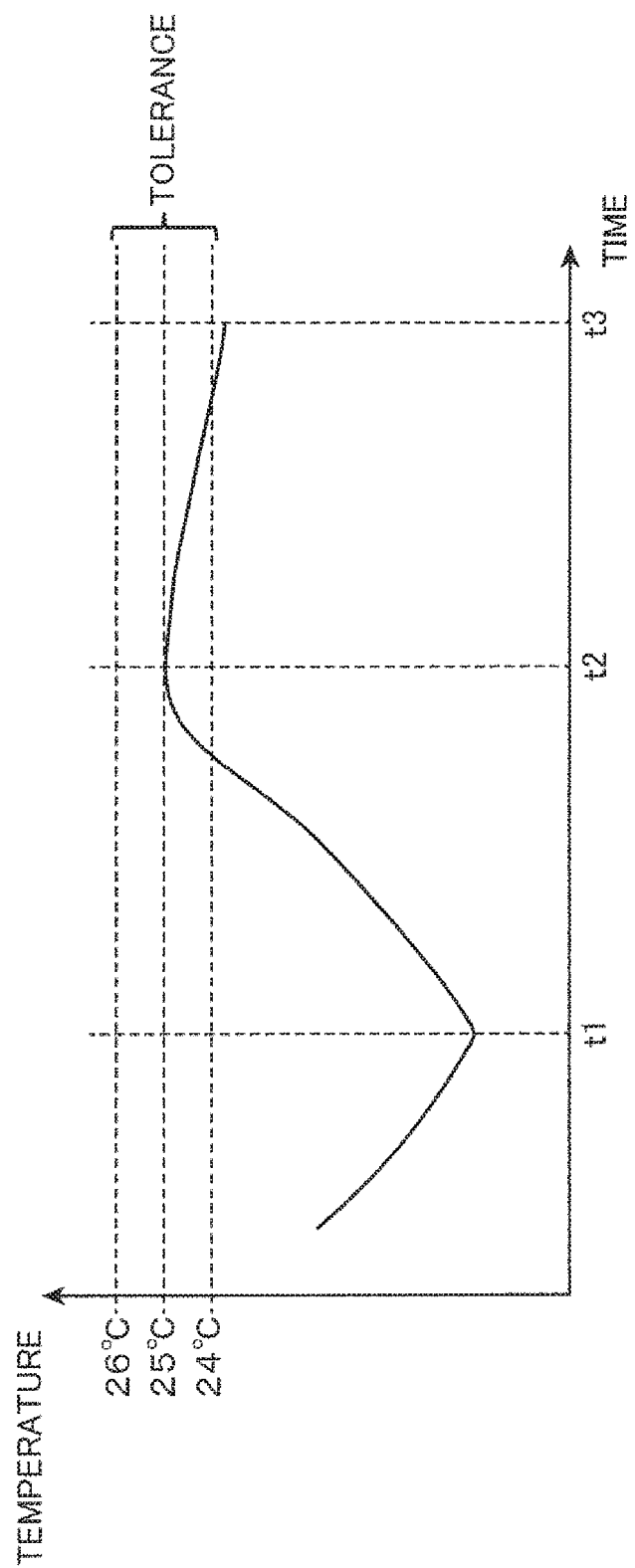
FIG. 16 is a diagram for describing a modification of communication timing between the cloud server and the external device in the first embodiment of the present disclosure.

FIG. 16 is a diagram for describing a modification of communication timing between the cloud server and the external device in the first embodiment of the present disclosure. A graph shown in FIG. 16 shows a time-series change in an actual measured value of the temperature measured by the sensor 32 of the external device 30. A time t1 is timing at which the air-conditioning apparatus 10 is turned on. A time t2 is timing at which the measured temperature reaches a set temperature. A time t3 is timing at which the measured temperature deviates from a predetermined tolerance.

After the air-conditioning apparatus 10 is turned on, by determining whether the measured temperature has reached the set temperature, the communication control unit 311 determines whether it is timing to transmit the first sensor value of step S13 in FIG. 11. That is, the communication control unit 311 determines that it is timing to transmit the first sensor value when the measured temperature reaches the set temperature. In the example shown in FIG. 16, the first sensor value is transmitted at timing of the time t2. For example, when the external device 30 is a remote controller, the temperature that is set by the external device 30 can be used as the set temperature. When the external device 30 is not a remote controller, the set temperature may be acquired at timing at which the air-conditioning apparatus is turned on as described in FIG. 15.

Such a configuration allows the cloud server 20 and the air-conditioning apparatus 10 to securely grasp timing at which the indoor temperature reaches the set temperature, and thus to control the air-conditioning apparatus 10 appropriately even when the prediction is wrong. Generally, until the indoor temperature reaches the set temperature, the air-conditioning apparatus 10 increases a processing load of the air-conditioning apparatus 10, and after the indoor temperature reaches the set temperature, the air-conditioning apparatus 10 decreases the processing load of the air-conditioning apparatus 10 and reduces power consumption by an intermittent operation. For example, when the prediction is wrong and the indoor temperature reaches the set temperature earlier than the predicted time, the air-conditioning apparatus 10 decreases the processing load earlier than prediction and reduces power consumption. Meanwhile, when the prediction is wrong and the indoor temperature reaches the set temperature later than the predicted time, the cloud server 20 corrects the first sensor predicted value and keeps the processing load of the air-conditioning apparatus 10 from decreasing, thereby causing the indoor temperature to reach the set temperature.

Note that communication is not occasionally established due to a fault in the communication. Therefore, in addition to a condition of whether the indoor temperature has reached the set temperature, the communication control unit 311 may set a communication time out value. Alternatively, instead of using that the indoor temperature has reached the set temperature as a transmission condition, the communication control unit 311 may use that the current time has reached a time when the indoor temperature is expected to reach the set temperature as the transmission condition. Note that the time when the indoor temperature is expected to reach the set temperature is predicted by the cloud server 20 and is transmitted to the external device 30.

After the air-conditioning apparatus 10 is turned on and the indoor temperature reaches the set temperature, as shown in FIG. 16, the communication control unit 311 may set the tolerance for the set temperature, and perform communication at timing at which the indoor temperature deviates from the tolerance (time t3). The tolerance may be, for example, a range between the set temperature −1 degrees and the set temperature +1 degree. Such a configuration allows appropriate control of the air-conditioning apparatus 10 even when the prediction result is wrong. Generally, the air-conditioning apparatus 10 controls air-conditioning to maintain the same temperature when the indoor temperature reaches the set temperature. Although the indoor temperature does not originally deviate from the tolerance, it is possible to avoid errors and to maintain comfort by performing communication only when the indoor temperature deviates from the tolerance. It is also possible to decrease the frequency to perform minimum communication. Note that communication is not occasionally established due to a fault in the communication. Therefore, in addition to a condition of whether the indoor temperature has deviated from the tolerance, the communication control unit 311 may set the communication time out value.

In the present embodiment, the prediction information transmission unit 215 transmits the first sensor predicted value to the air-conditioning apparatus 10, and the air-conditioning control unit 112 controls air-conditioning by using the first sensor predicted value. The air-conditioning setting unit 232 may change the set temperature by using the first sensor predicted value and the measured temperature of the air-conditioning apparatus 10, and may set the changed set temperature in the air-conditioning control unit 112. That is, the air-conditioning setting unit 232 may subtract a difference between the measured temperature of the external device 30 and the measured temperature of the air-conditioning apparatus 10 from the set temperature. For example, when the air-conditioning apparatus 10 is operated for cooling, the set temperature is 25 degrees C., the measured temperature of the air-conditioning apparatus 10 is 25 degrees C., and the first sensor predicted value of the external device 30 is 28 degrees C., then the air-conditioning setting unit 232 changes the set temperature to 22 degrees C. (=25 degrees C.−(28 degrees C.−25 degrees C.)), and transmits the changed set temperature. With such a configuration, the air-conditioning control method of the air-conditioning apparatus 10 does not need to consider the indoor temperature measured by the external device 30, and can use the existing air-conditioning apparatus 10.

Second Embodiment

In the present second embodiment, a frequency at which a first sensor value acquisition unit 211 acquires a first sensor value from an external device 30 may be changed with prediction accuracy of a prediction model an indoor environment prediction unit 231 generates.

Figure 17:
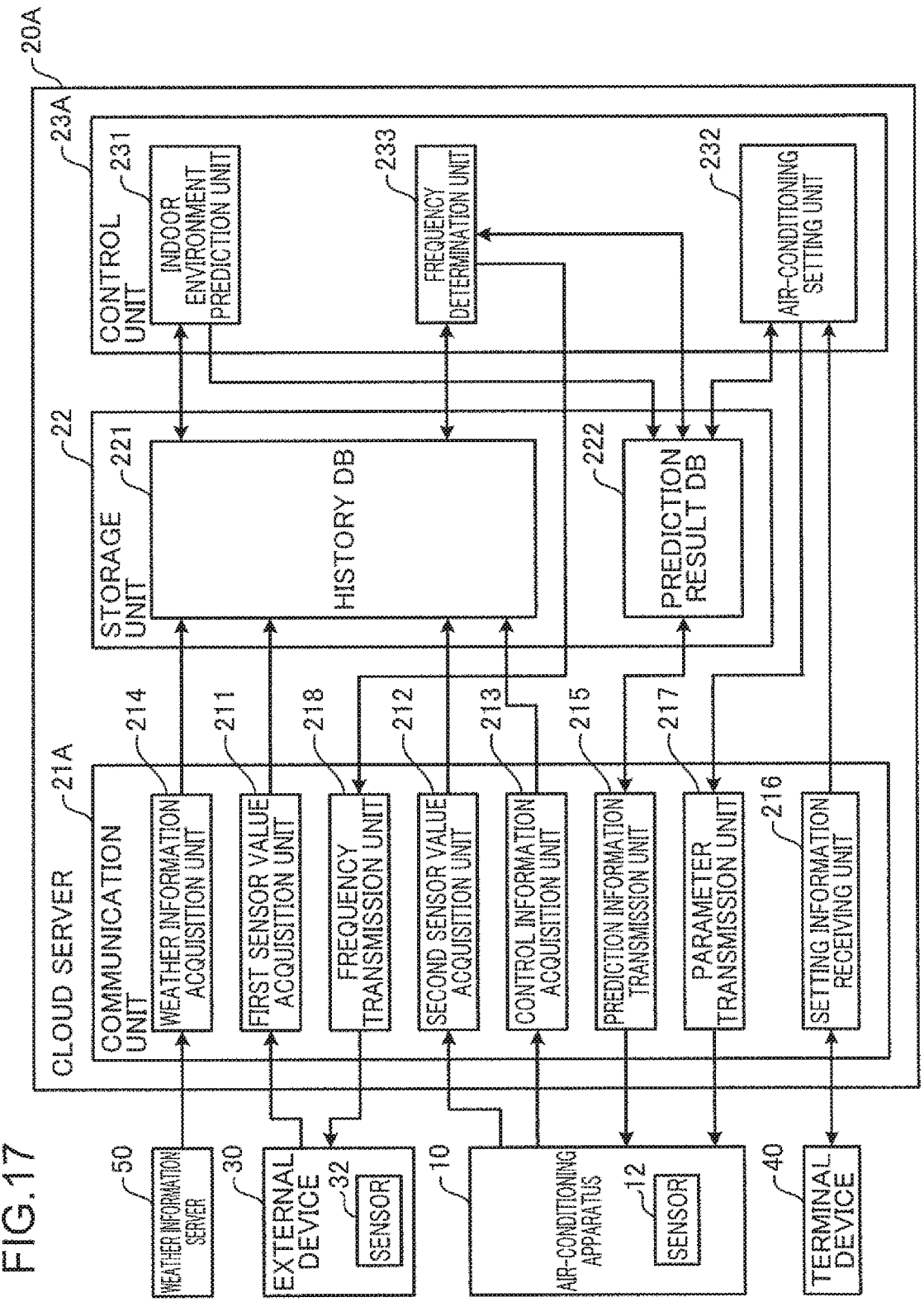
FIG. 17 is a block diagram showing a configuration of an air-conditioning control system and a cloud server in a second embodiment of the present disclosure.

FIG. 17 is a block diagram showing a configuration of an air-conditioning control system and a cloud server in the second embodiment of the present disclosure. Note that in FIG. 17, the same components as in the first embodiment are denoted with the same reference signs, and descriptions thereof will be omitted.

The air-conditioning control system includes an air-conditioning apparatus 10, a cloud server 20A, an external device 30, a terminal device 40, and a weather information server 50. The cloud server 20A includes a communication unit 21A, a storage unit 22, and a control unit 23A. The communication unit 21A includes a first sensor value acquisition unit 211, a second sensor value acquisition unit 212, a control information acquisition unit 213, a weather information acquisition unit 214, a prediction information transmission unit 215, a setting information receiving unit 216, a parameter transmission unit 217, and a frequency transmission unit 218. The control unit 23A includes the indoor environment prediction unit 231, an air-conditioning setting unit 232, and a frequency determination unit 233.

The frequency determination unit 233 determines a first frequency for acquiring the first sensor value by using a first sensor predicted value and the first sensor value. The frequency determination unit 233 determines the first frequency based on a difference between the first sensor value in a past, and the first sensor predicted value generated from the second sensor value acquired in the past when the first sensor value is acquired in the past, air-conditioning control information, and weather information.

Note that the frequency determination unit 233 may determine the first frequency based on a difference between the first sensor value in a past, and the first sensor predicted value generated from the second sensor value acquired in the past when the first sensor value is acquired in the past.

The frequency determination unit 233 calculates an absolute average error between the first sensor predicted value generated by inputting past historical data into the prediction model, and an actual measured value of the first sensor value. This absolute average error represents prediction accuracy. For example, the frequency determination unit 233 may learn using part of the past historical data (for example, 70%), predict using the remainder of the past historical data (for example, remaining 30%), and calculate the absolute average error between the predicted value and the actual measured value.

When the prediction accuracy is low, that is, when the difference between the first sensor predicted value and the actual measured value of the first sensor value (absolute average error) is larger than a predetermined value, the frequency determination unit 233 determines the first frequency higher than the current first frequency. For example, the frequency determination unit 233 changes the current first frequency for performing transmission once per 60 minutes to the first frequency for performing transmission once per 10 minutes. With such a configuration, when the prediction accuracy is low, it is possible to prevent the actual first sensor value of the external device 30 from greatly deviating from the first sensor predicted value.

When the prediction accuracy is high, that is, when the difference between the first sensor predicted value and the actual measured value of the first sensor value (absolute average error) is smaller than a predetermined value, the frequency determination unit 233 may determine the first frequency to maintain the current first frequency, or determine the first frequency lower than the current first frequency. For example, the frequency determination unit 233 may maintain the current first frequency for performing transmission once per 60 minutes. For example, the frequency determination unit 233 may change the current first frequency for performing transmission once per 60 minutes to the first frequency for performing transmission once per 90 minutes.

The frequency transmission unit 218 transmits the frequency for acquiring the first sensor value determined by the frequency determination unit 233 (first frequency) to the external device 30.

In the learning processing by the cloud server 20A in FIG. 12, after acquisition of the first sensor value of step S21, the frequency determination unit 233 determines the first frequency for acquiring the first sensor value according to the prediction accuracy. The frequency transmission unit 218 then transmits the first frequency determined by the frequency determination unit 233 to the external device 30.

In the data transmission processing by the external device 30 in FIG. 11, after transmission of the first sensor value of step S14, the communication unit 34 of the external device 30 receives the first frequency according to the prediction accuracy from the cloud server 20A. In step S13 of FIG. 11, the communication control unit 311 determines whether it is timing to transmit the first sensor value according to the received first frequency.

Third Embodiment

In the present third embodiment, an acquisition data quantity of a first sensor value acquired by a first sensor value acquisition unit 211 from an external device 30 may be changed with prediction accuracy of a prediction model an indoor environment prediction unit 231 generates.

Figure 18:
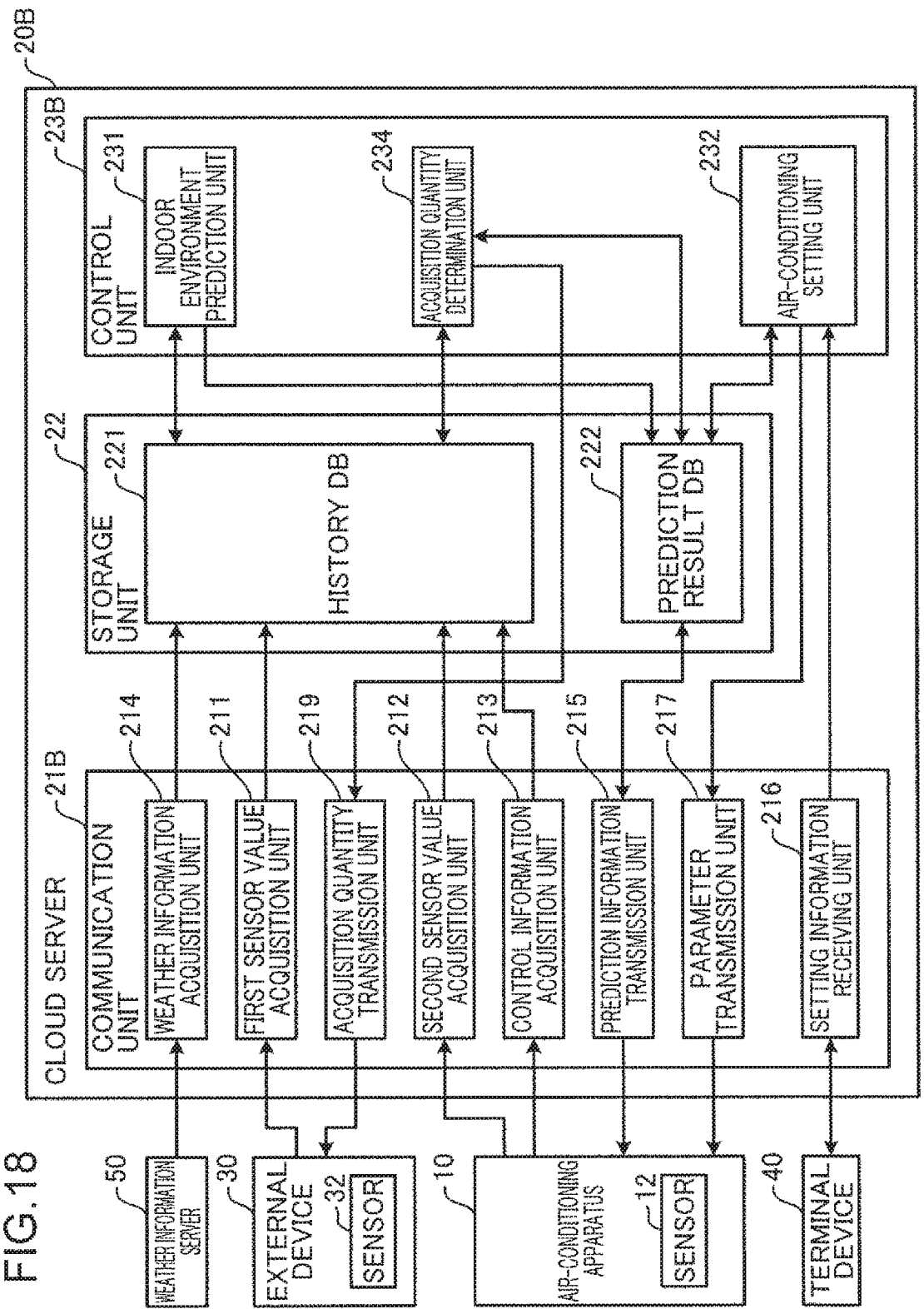
FIG. 18 is a block diagram showing a configuration of an air-conditioning control system and a cloud server in a third embodiment of the present disclosure.

FIG. 18 is a block diagram showing a configuration of an air-conditioning control system and a cloud server in the third embodiment of the present disclosure. Note that in FIG. 18, the same components as in the first embodiment are denoted with the same reference signs, and descriptions thereof will be omitted.

The air-conditioning control system includes an air-conditioning apparatus 10, a cloud server 20B, an external device 30, a terminal device 40, and a weather information server 50. The cloud server 20B includes a communication unit 21B, a storage unit 22, and a control unit 23B. The communication unit 21B includes a first sensor value acquisition unit 211, a second sensor value acquisition unit 212, a control information acquisition unit 213, a weather information acquisition unit 214, a prediction information transmission unit 215, a setting information receiving unit 216, a parameter transmission unit 217, and an acquisition quantity transmission unit 219. The control unit 23B includes the indoor environment prediction unit 231, an air-conditioning setting unit 232, and an acquisition quantity determination unit 234.

The acquisition quantity determination unit 234 determines an acquisition quantity of a first sensor value by using a first sensor predicted value and a first sensor value. The acquisition quantity determination unit 234 determines the acquisition quantity of the first sensor value based on a difference between the first sensor value in a past, and the first sensor predicted value generated from the second sensor value acquired in the past when the first sensor value is acquired in the past, air-conditioning control information, and weather information.

Note that the acquisition quantity determination unit 234 may determine the acquisition quantity of the first sensor value based on a difference between the first sensor value in a past, and the first sensor predicted value generated from the second sensor value acquired in the past when the first sensor value is acquired in the past.

The acquisition quantity determination unit 234 calculates an absolute average error between the first sensor predicted value generated by inputting past historical data into the prediction model, and an actual measured value of the first sensor value. This absolute average error represents prediction accuracy. For example, the acquisition quantity determination unit 234 may learn using part of the past historical data (for example, 70%), predict using the remainder of the past historical data (for example, remaining 30%), and calculate the absolute average error between the predicted value and the actual measured value.

In the present third embodiment, for example, the measured first sensor value is stored in a first sensor value storage unit 331 at a frequency of once per minute, and the stored 60 first sensor values are transmitted to the cloud server 20B at a frequency of once per 60 minutes. At this time, when the prediction accuracy is high, that is, when the difference between the first sensor predicted value and the actual measured value of the first sensor value (absolute average error) is smaller than a predetermined value, the acquisition quantity determination unit 234 determines the acquisition quantity (communication data quantity) at 20, which is smaller than the current acquisition quantity. In that case, during next transmission of the first sensor value of step S14, the communication control unit 311 thins out 40 first sensor values from the 60 first sensor values, and transmits 20 first sensor values to the cloud server 20B. With such a configuration, when the prediction accuracy is high, the communication data quantity can be reduced, and thus a processing load of the external device 30 can be reduced, and further power-saving can be achieved.

Note that when the prediction accuracy is low, that is, when the difference between the first sensor predicted value and the actual measured value of the first sensor value (absolute average error) is larger than a predetermined value, the acquisition quantity determination unit 234 may determine the acquisition quantity to maintain the current acquisition quantity, or determine the acquisition quantity larger than the current acquisition quantity. For example, the acquisition quantity determination unit 234 may maintain the current acquisition quantity of 60. Alternatively, for example, the acquisition quantity determination unit 234 may change the current acquisition quantity of 20 to the acquisition quantity of 60. Note that an upper limit of the acquisition quantity is the number of the first sensor values stored in the first sensor value storage unit 331 during a period from the transmission of the first sensor value to the transmission of the next first sensor value.

The acquisition quantity transmission unit 219 transmits the acquisition quantity of the first sensor value determined by the acquisition quantity determination unit 234 to the external device 30.

In the learning processing by the cloud server 20 in FIG. 12, after acquisition of the first sensor value of step S21, the acquisition quantity determination unit 234 determines the acquisition quantity of the first sensor value according to the prediction accuracy. Then, the acquisition quantity transmission unit 219 transmits the acquisition quantity of the first sensor value determined by the acquisition quantity determination unit 234 to the external device 30.

In the data transmission processing by the external device 30 in FIG. 11, after transmission of the first sensor value of step S14, the communication unit 34 of the external device 30 receives the acquisition quantity of the first sensor value (communication data quantity) from the cloud server 20 according to the prediction accuracy. The communication control unit 311 adjusts the data quantity of the first sensor value during transmission of the next first sensor value according to the received acquisition quantity (communication data quantity).

Fourth Embodiment

In the present fourth embodiment, an indoor environment prediction unit 231 may change a prediction model to use for prediction depending on prediction accuracy of a prediction result.

Figure 19:
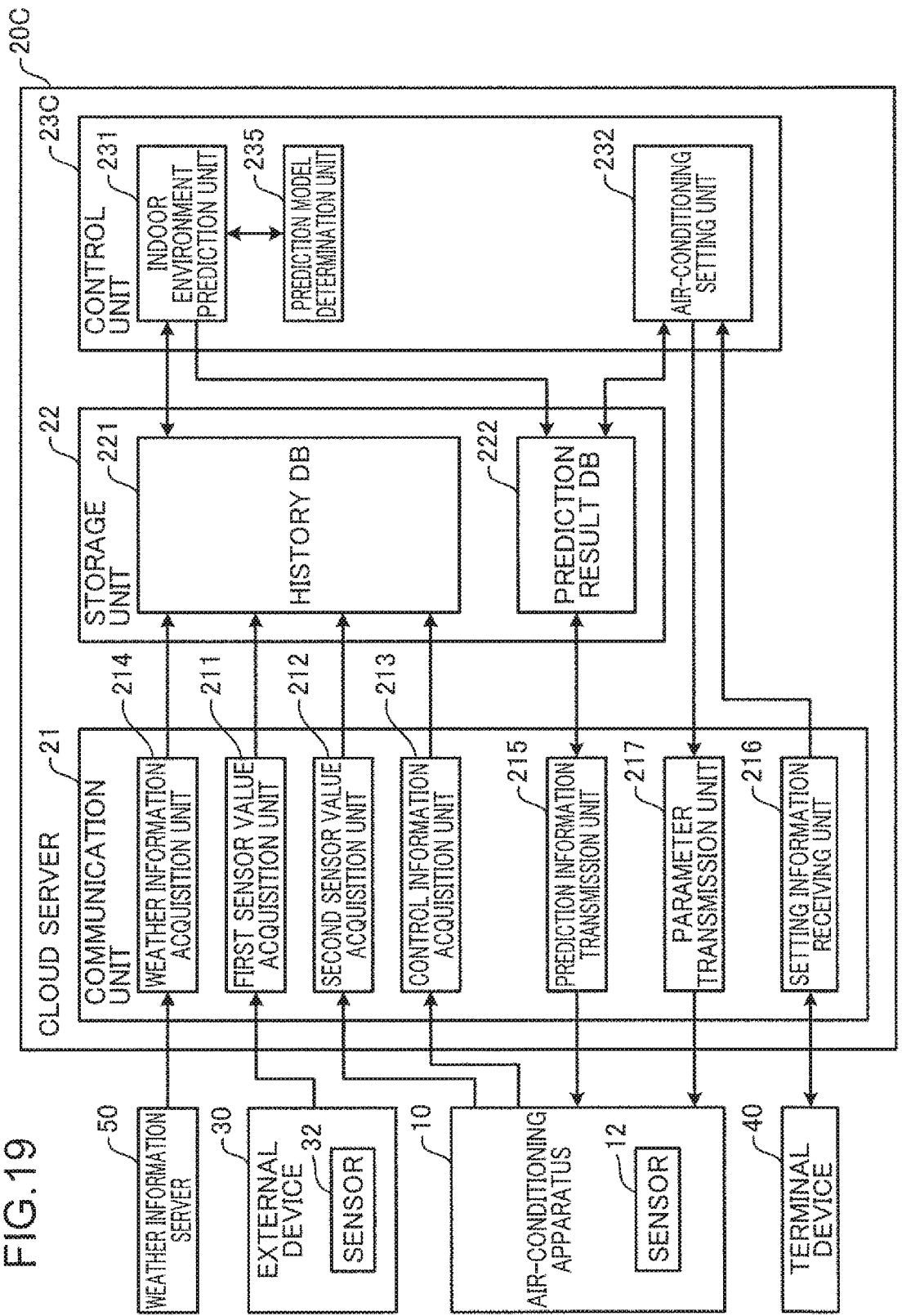
FIG. 19 is a block diagram showing a configuration of an air-conditioning control system and a cloud server in a fourth embodiment of the present disclosure.

FIG. 19 is a block diagram showing a configuration of an air-conditioning control system and a cloud server in the fourth embodiment of the present disclosure. Note that in FIG. 19, the same components as in the first embodiment are denoted with the same reference signs, and descriptions thereof will be omitted.

The air-conditioning control system includes an air-conditioning apparatus 10, a cloud server 20C, an external device 30, a terminal device 40, and a weather information server 50. The cloud server 20C includes a communication unit 21, a storage unit 22, and a control unit 23C. The control unit 23C includes the indoor environment prediction unit 231, an air-conditioning setting unit 232, and a prediction model determination unit 235.

The indoor environment prediction unit 231 generates a plurality of prediction models learned by different learning methods, and stores the generated prediction models in the storage unit 22. The storage unit 22 stores the plurality of prediction models. The prediction model determination unit 235 determines the prediction model to use from the plurality of prediction models by using a first sensor predicted value and a first sensor value. The prediction model determination unit 235 determines the prediction model to use from the plurality of prediction models based on a difference between the first sensor value in a past, and the first sensor predicted value generated from the second sensor value acquired in the past when the first sensor value is acquired in the past, air-conditioning control information, and weather information.

Note that the prediction model determination unit 235 may determine the prediction model to use from the plurality of prediction models based on a difference between the first sensor value in a past, and the first sensor predicted value generated from the second sensor value acquired in the past when the first sensor value is acquired in the past.

The prediction model determination unit 235 calculates an absolute average error between the first sensor predicted value generated by inputting past historical data into the prediction model, and an actual measured value of the first sensor value. This absolute average error represents prediction accuracy. For example, the prediction model determination unit 235 may learn using part of the past historical data (for example, 70%), predict using the remainder of the past historical data (for example, remaining 30%), and calculate the absolute average error between the predicted value and the actual measured value.

When the prediction accuracy is low, that is, when the difference between the first sensor predicted value and the actual measured value of the first sensor value (absolute average error) is larger than a predetermined value, the prediction model determination unit 235 switches the prediction model to use to another prediction model. In this case, the indoor environment prediction unit 231 changes the learning method and generates a plurality of prediction models, and stores the plurality of prediction models with the different learning method in the storage unit 22. The indoor environment prediction unit 231 may generate, for example, the prediction model that is learned by using historical data in a different acquisition period, the prediction model that is learned by changing a parameter of an explanatory variable, and the prediction model that is learned by using different algorithms. Such a configuration can improve prediction accuracy.

Fifth Embodiment

In the present fifth embodiment, a first sensor predicted value generated by an indoor environment prediction unit 231 may be used for detecting an abnormality of an external device 30.

Figure 20:
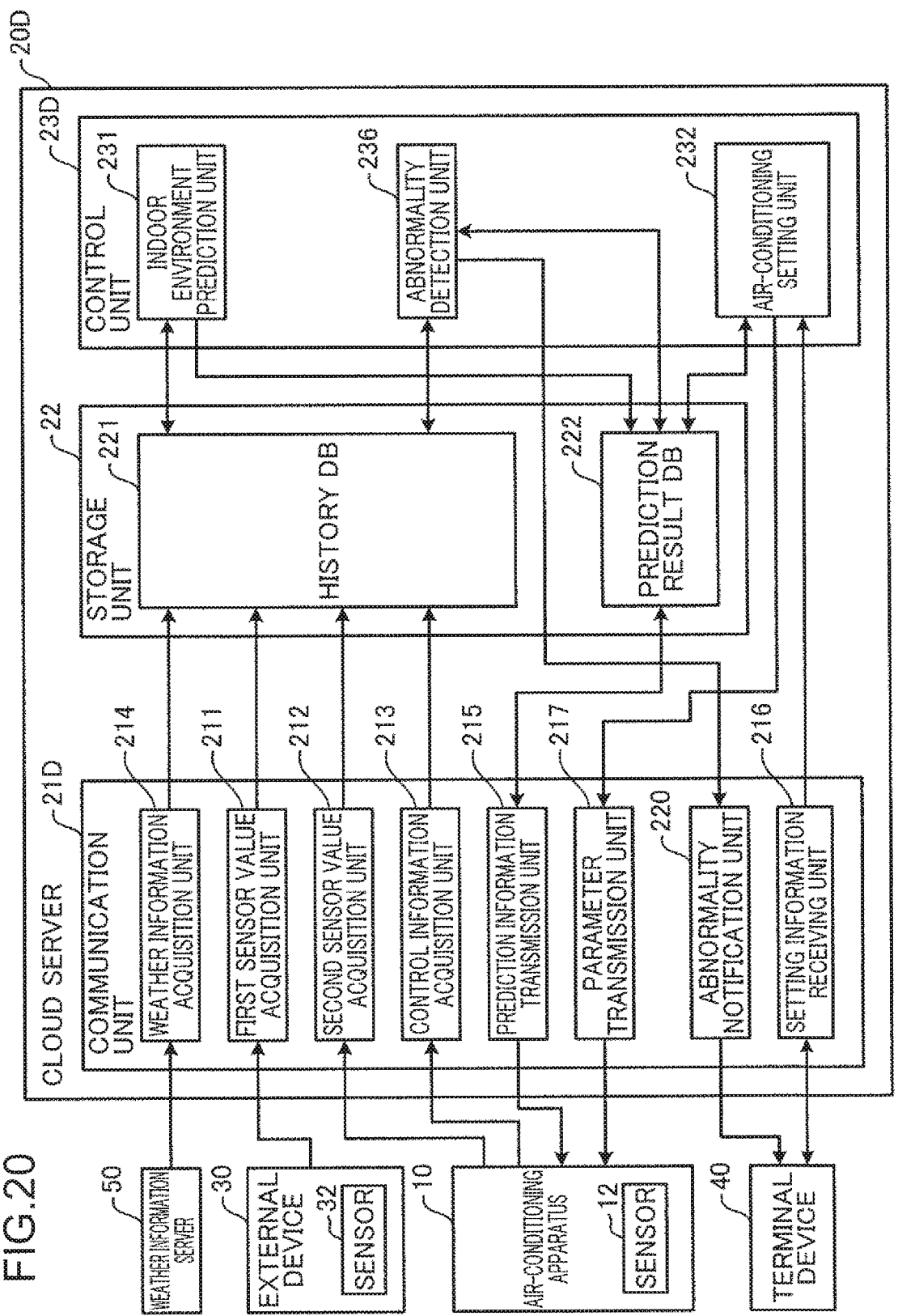
FIG. 20 is a block diagram showing a configuration of an air-conditioning control system and a cloud server in a fifth embodiment of the present disclosure.

FIG. 20 is a block diagram showing a configuration of an air-conditioning control system and a cloud server in the fifth embodiment of the present disclosure. Note that in FIG. 20, the same components as in the first embodiment are denoted with the same reference signs, and descriptions thereof will be omitted.

The air-conditioning control system includes an air-conditioning apparatus 10, a cloud server 20D, an external device 30, a terminal device 40, and a weather information server 50. The cloud server 20D includes a communication unit 21D, a storage unit 22, and a control unit 23D. The communication unit 21D includes a first sensor value acquisition unit 211, a second sensor value acquisition unit 212, a control information acquisition unit 213, a weather information acquisition unit 214, a prediction information transmission unit 215, a setting information receiving unit 216, a parameter transmission unit 217, and an abnormality notification unit 220. The control unit 23D includes the indoor environment prediction unit 231, an air-conditioning setting unit 232, and an abnormality detection unit 236.

The abnormality detection unit 236 detects an abnormality of a sensor 32 of the external device 30 (first sensor device) by using a first sensor predicted value and a first sensor value. The abnormality detection unit 236 detects an abnormality of the sensor 32 of the external device 30 based on a difference between the first sensor value in a past, and the first sensor predicted value generated from the second sensor value acquired in the past when the first sensor value is acquired in the past, air-conditioning control information, and weather information.

Note that the abnormality detection unit 236 may detect an abnormality of the sensor 32 of the external device 30 based on a difference between the first sensor value in a past, and the first sensor predicted value generated from the second sensor value acquired in the past when the first sensor value is acquired in the past.

The abnormality detection unit 236 calculates an absolute average error between the first sensor predicted value generated by inputting past historical data into a prediction model, and an actual measured value of the first sensor value. This absolute average error represents prediction accuracy. For example, the abnormality detection unit 236 may learn using part of the past historical data (for example, 70%), predict using the remainder of the past historical data (for example, remaining 30%), and calculate the absolute average error between the predicted value and the actual measured value.

When the prediction accuracy is low, that is, when the difference between the first sensor predicted value and the actual measured value of the first sensor value (absolute average error) is larger than a predetermined value, the abnormality detection unit 236 detects an abnormality of the sensor 32 of the external device 30. For example, when the prediction accuracy deteriorates significantly, a possibility that the external device 30 is transferred to another room or exposed to another heat source is suspected.

When the abnormality detection unit 236 detects an abnormality of the sensor 32 of the external device 30, the abnormality notification unit 220 transmits abnormality notification information for notifying a user of occurrence of the abnormality in the sensor 32 of the external device 30 to the terminal device 40. In this case, the abnormality notification information may include, for example, a message for checking an installation position of the external device 30. Such a configuration makes it possible to detect an error of the external device 30 and to notify the user.

Sixth Embodiment

In the present sixth embodiment, a first sensor predicted value generated by an indoor environment prediction unit 231 may be corrected according to prediction accuracy of a prediction result of the indoor environment prediction unit 231.

Figure 21:
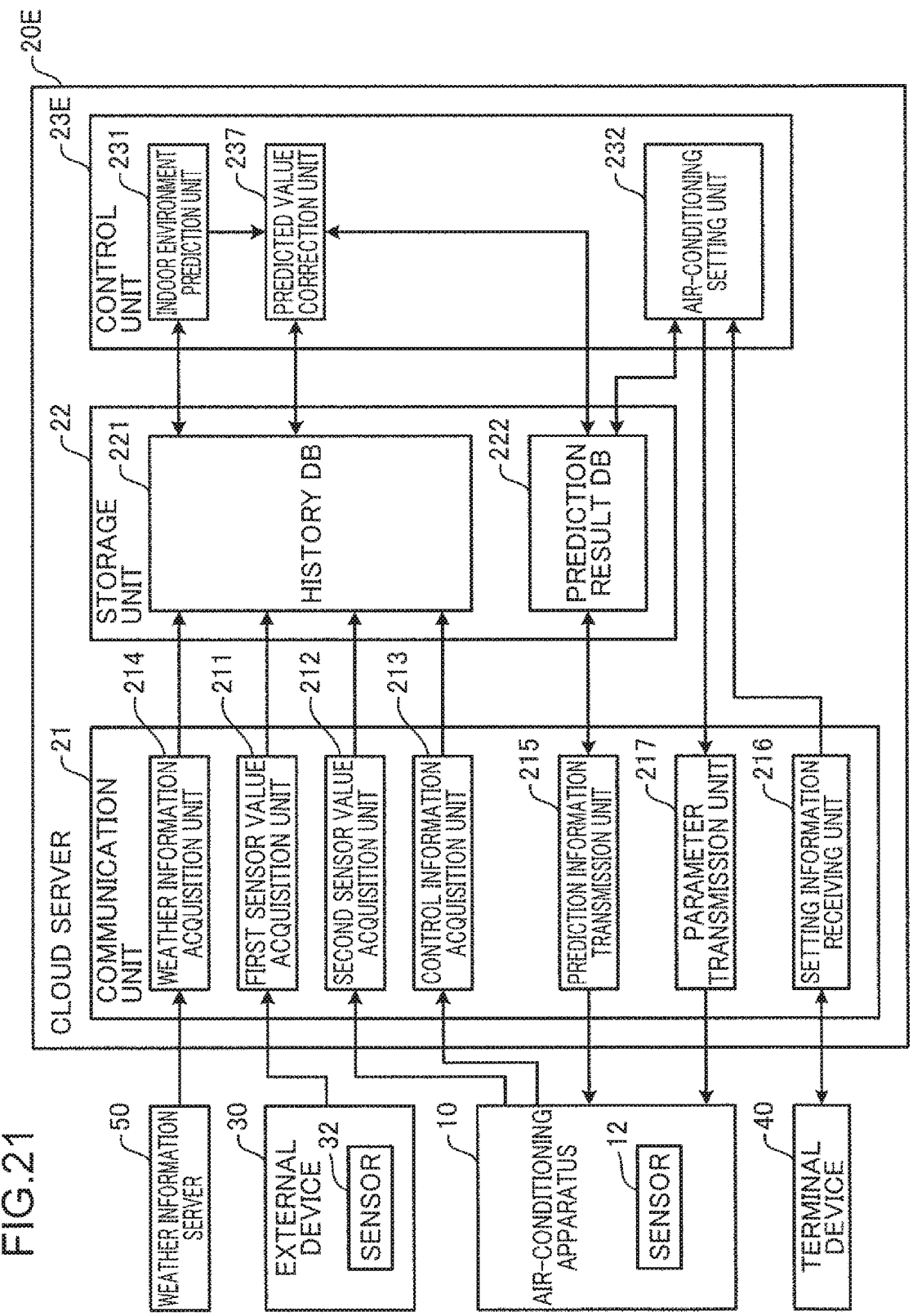
FIG. 21 is a block diagram showing a configuration of an air-conditioning control system and a cloud server in a sixth embodiment of the present disclosure.

FIG. 21 is a block diagram showing a configuration of an air-conditioning control system and a cloud server in the sixth embodiment of the present disclosure. Note that in FIG. 21, the same components as in the first embodiment are denoted with the same reference signs, and descriptions thereof will be omitted.

The air-conditioning control system includes an air-conditioning apparatus 10, a cloud server 20E, an external device 30, a terminal device 40, and a weather information server 50. The cloud server 20E includes a communication unit 21, a storage unit 22, and a control unit 23E. The control unit 23E includes the indoor environment prediction unit 231, an air-conditioning setting unit 232, and a predicted value correction unit 237.

The predicted value correction unit 237 corrects the first sensor predicted value by using the first sensor predicted value and a first sensor value. The predicted value correction unit 237 corrects the first sensor predicted value based on a difference between the first sensor value in a past, and the first sensor predicted value generated from the second sensor value acquired in the past when the first sensor value is acquired in the past, air-conditioning control information, and weather information.

Note that the predicted value correction unit 237 may correct the first sensor predicted value based on a difference between the first sensor value in a past, and the first sensor predicted value generated from the second sensor value acquired in the past when the first sensor value is acquired in the past.

The predicted value correction unit 237 calculates an absolute average error between the first sensor predicted value generated by inputting past historical data into a prediction model, and an actual measured value of the first sensor value. This absolute average error represents prediction accuracy. For example, the predicted value correction unit 237 may learn using part of the past historical data (for example, 70%), predict using the remainder of the past historical data (for example, remaining 30%), and calculate the absolute average error between the predicted value and the actual measured value.

When the prediction accuracy is low, that is, when the difference between the first sensor predicted value and the actual measured value of the first sensor value (absolute average error) is larger than a predetermined value, the predicted value correction unit 237 corrects the first sensor predicted value. Specifically, the predicted value correction unit 237 adds an average error between the first sensor predicted value and the actual measured value of the first sensor value in a past predetermined period to the first sensor predicted value. Such a configuration can correct a prediction result and improve prediction accuracy.

The air-conditioning control system in the present first to sixth embodiments has been described above.

Note that techniques described in the above-described aspects can be implemented, for example, in the following types of cloud services. However, the types of cloud service by which the techniques described in the aspects are implemented are not limited to these types.

(Type of Service 1: Company-Owned Data Center Type Cloud Service)

Figure 22:
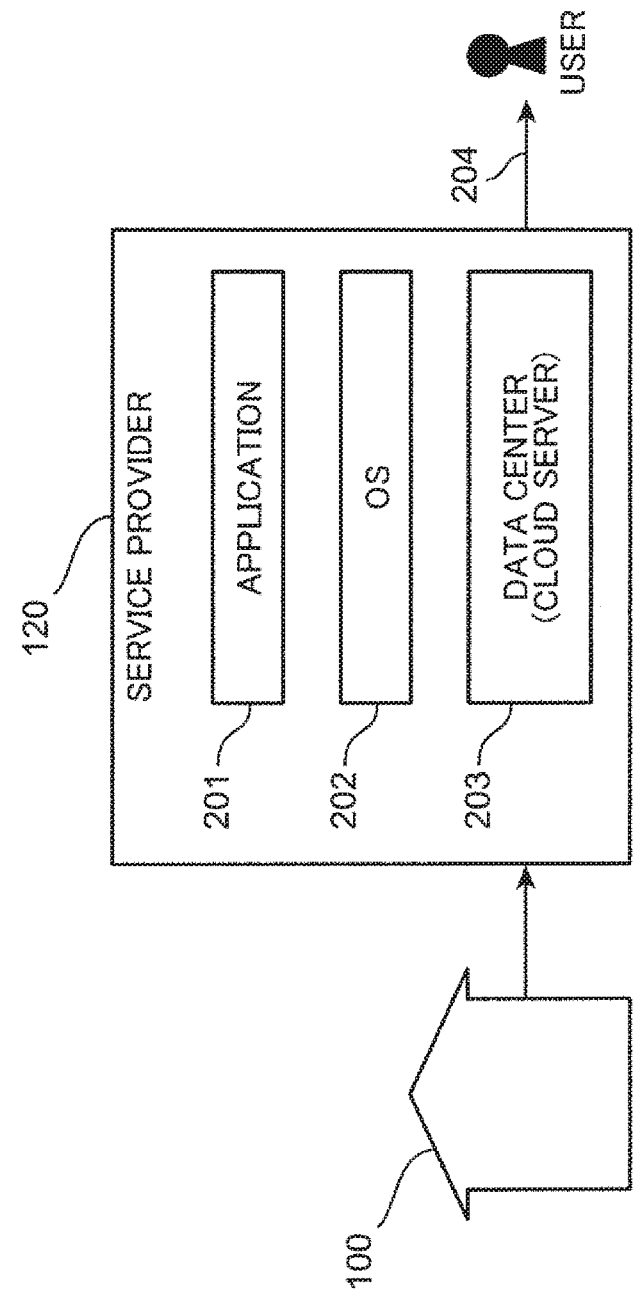
FIG. 22 is a diagram showing an overview of a service to be provided by the air-conditioning control system in a type of service 1 (company-owned data center type cloud service)

FIG. 22 is a diagram showing an overview of a service provided by the air-conditioning control system in the type of service 1 (company-owned data center type cloud service). In this type, the service provider 120 acquires information from the group 100 and provides a service to a user. In this type, the service provider 120 has a function of the data center operating company. That is, the service provider 120 has the cloud server 113 managing big data. Therefore, the data center operating company is not present.

In this type, the service provider 120 runs and manages the data center (cloud server) 203. Also, the service provider 120 manages an operating system (OS) 202 and an application 201. The service provider 120 provides a service by using the OS 202 and the application 201 managed by the service provider 120 (arrow 204).

(Type of Service 2: IaaS Use Type Cloud Service)

Figure 23:
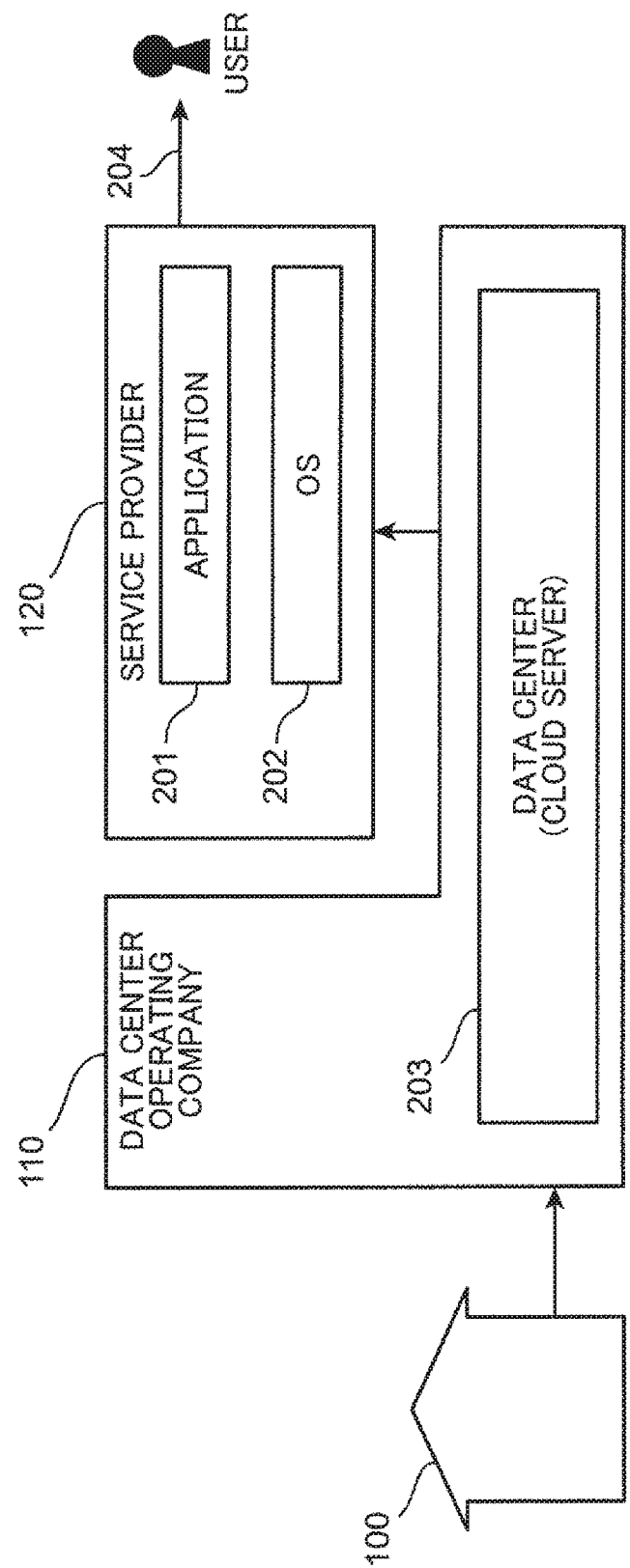
FIG. 23 is a diagram showing an overview of a service to be provided by the air-conditioning control system in a type of service 2 (IaaS use type cloud service)

FIG. 23 is a diagram showing an overview of a service provided by the air-conditioning control system in the type of service 2 (IaaS use type cloud service). Here, IaaS is an abbreviation for infrastructure as a service, and is a cloud service providing model that provides a base itself for constructing and operating a computer system as a service over the Internet.

In this type, the data center operating company 110 runs and manages the data center (cloud server) 203. The service provider 120 manages the OS 202 and the application 201. The service provider 120 provides a service by using the OS 202 and the application 201 managed by the service provider 120 (arrow 204).

(Type of Service 3: PaaS Use Type Cloud Service)

Figure 24:
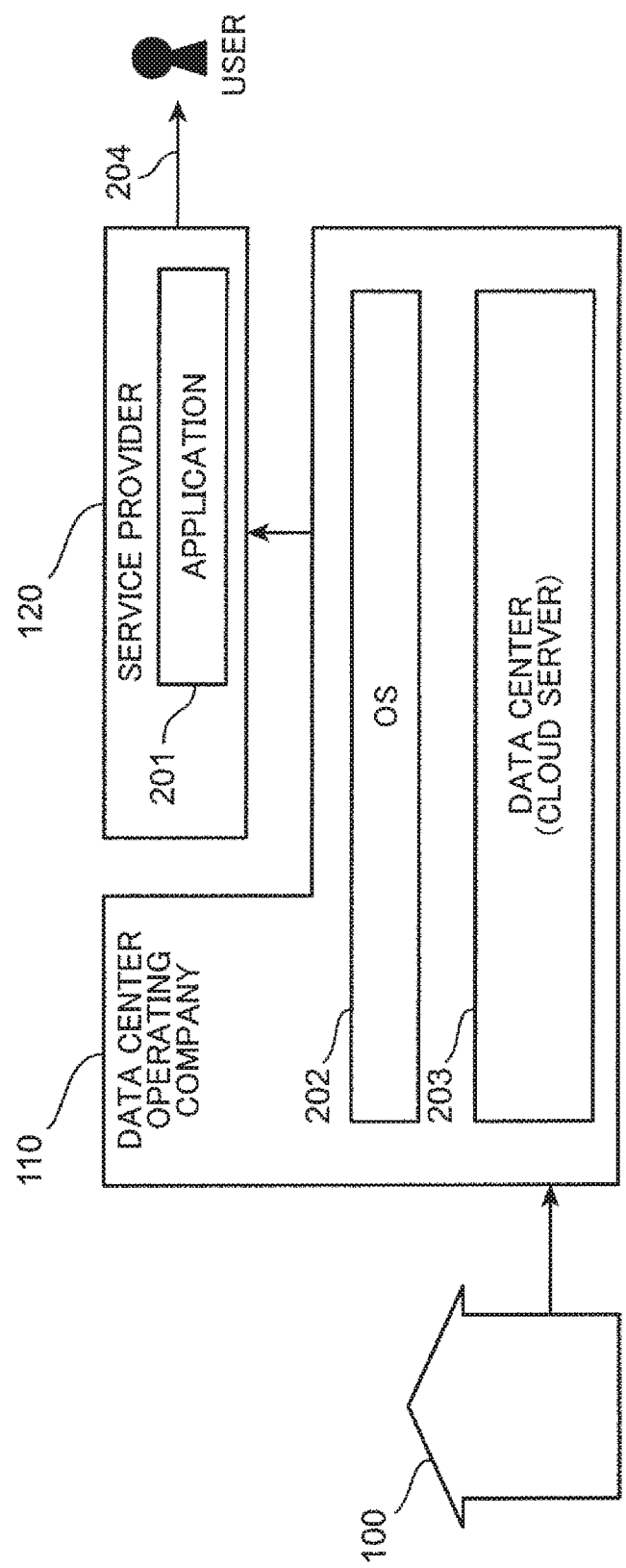
FIG. 24 is a diagram showing an overview of a service to be provided by the air-conditioning control system in a type of service 3 (PaaS use type cloud service)

FIG. 24 is a diagram showing an overview of a service provided by the air-conditioning control system in the type of service 3 (PaaS use type cloud service). Here, PaaS is an abbreviation for platform as a service, and is a cloud service providing model that provides a platform serving as a foundation for constructing and operating software as a service over the Internet.

In this type, the data center operating company 110 manages the OS 202 and runs and manages the data center (cloud server) 203. The service provider 120 manages the application 201. The service provider 120 provides a service by using the OS 202 managed by the data center operating company 110 and the application 201 managed by the service provider 120 (arrow 204).

(Type of Service 4: SaaS Use Type Cloud Service)

Figure 25:
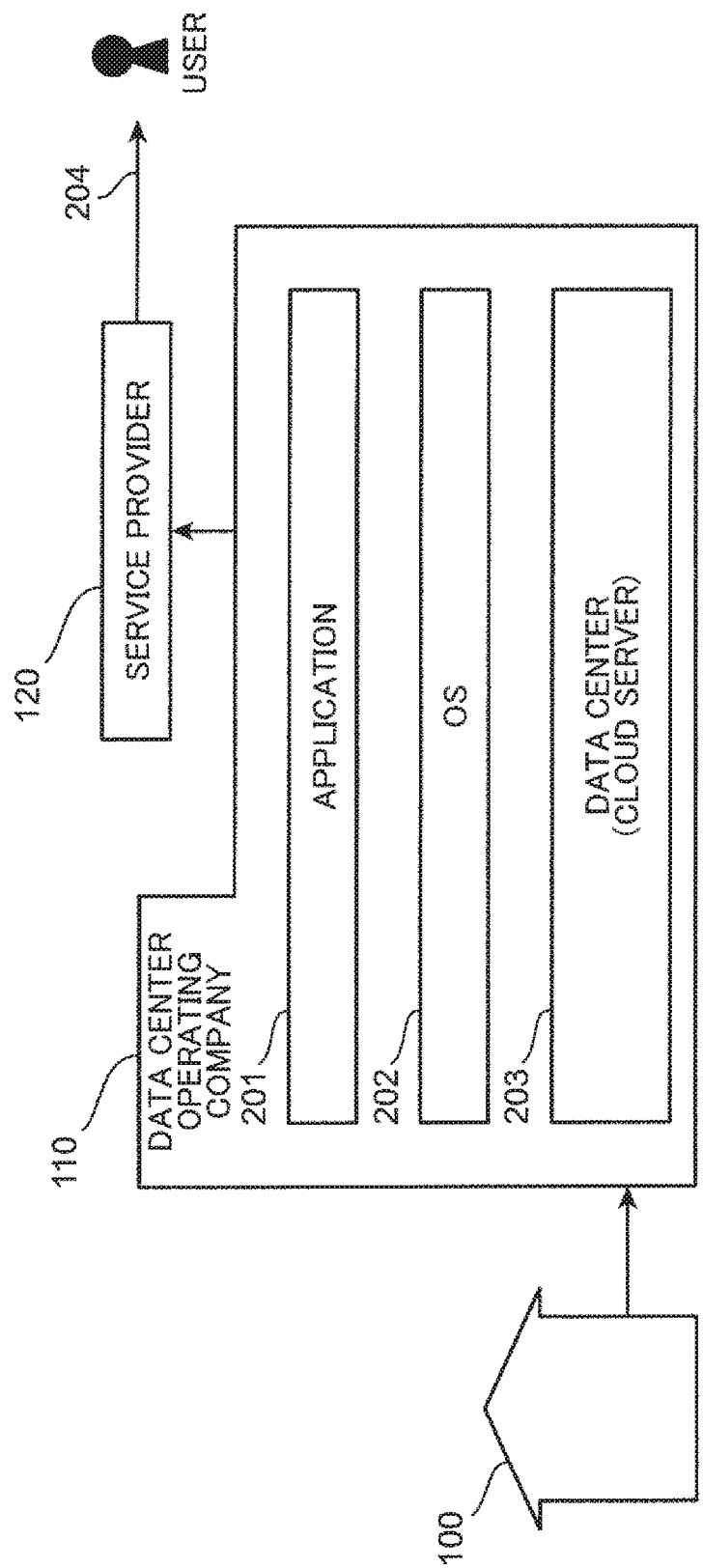
FIG. 25 is a diagram showing an overview of a service to be provided by the air-conditioning control system in a type of service 4 (SaaS use type cloud service).

FIG. 25 is a diagram showing an overview of a service provided by the air-conditioning control system in the type of service 4 (SaaS use type cloud service). Here, SaaS is an abbreviation for software as a service. The SaaS use type cloud service is, for example, a cloud service providing model having a function of allowing a user who does not have a data center (cloud server), such as a company or individual, to use an application provided by a platform provider having a data center (cloud server) over a network such as the Internet.

In this type, the data center operating company 110 manages the application 201, manages the OS 202, and runs and manages the data center (cloud server) 203. The service provider 120 provides a service by using the OS 202 and the application 201 managed by the data center operating company 110 (arrow 204).

As described above, the service provider 120 provides a service in any type of cloud service. For example, the service provider or the data center operating company may develop an OS, an application, or a database of big data by themselves, or outsource the development to a third party.

As described above, the device of the present disclosure has been described based on the embodiments, but the present disclosure is not limited to these embodiments. The present embodiments to which various modifications conceivable by a person skilled in the art are made and embodiments that are made by combining elements of different embodiments may also be within the scope of one or more aspects of the present disclosure as long as such embodiments do not depart from the spirit of the present disclosure.

In each of the embodiments described above, each component may be implemented with dedicated hardware or by executing a software program suitable for the component. Each component may be implemented by a program execution unit such as a central processing unit (CPU) or a processor reading and executing a software program recorded on a recording medium, such as a hard disk or a semiconductor memory.

Part or all of functions of the device according to the embodiments of the present disclosure are typically implemented as a large scale integration (LSI), which is an integrated circuit. These functions may be formed as separate chips, or some or all of the functions may be included in one chip. The circuit integration is not limited to LSI, and may be implemented using a dedicated circuit or a general-purpose processor. A field programmable gate array (FPGA) that is programmable after manufacturing of an LSI or a reconfigurable processor in which connections and settings of circuit cells within the LSI are reconfigurable may be used.

Part or all of functions of the device according to the embodiments of the present disclosure may be implemented by a processor such as a CPU executing a program.

Numerical values used above are merely illustrative to be used to specifically describe the present disclosure, and thus the present disclosure is not limited to the illustrative numerical values.

Order in which steps shown in the flowcharts are executed is merely illustrative to be used to specifically describe the present disclosure, and thus steps may be executed in order other than the above order as long as similar effects are obtained. Some of the steps may be executed simultaneously (in parallel) with other steps.

Furthermore, various modifications in which changes conceivable by a person skilled in the art are made to the embodiments of the present disclosure may also be within the scope of the present disclosure as long as such modifications do not depart from the spirit of the present disclosure.

The air-conditioning control method and the air-conditioning control device according to the present disclosure are useful as an air-conditioning control method and an air-conditioning control device that can reduce power consumption of the first sensor device, predict the first sensor value of the first sensor device accurately, and control operations of the air-conditioning apparatus by using the sensor value acquired from the external device other than the air-conditioning apparatus.

This application is based on Japanese Patent application No. 2017-235967 filed in Japan Patent Office on Dec. 8, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An air-conditioning control method comprising:
   periodically acquiring, by a processor and from a first sensor device at a predetermined communication frequency, a first sensor value transmitted by the first sensor device at the predetermined communication frequency, the first sensor device being provided at a different position than a second sensor device within a same space, the first sensor device including a memory that stores the measured first sensor value before transmitting to the processor;
   periodically acquiring, by the processor and from the second sensor device at a predetermined measuring frequency, a second sensor value that is measured the predetermined measuring frequency, wherein the second predetermined measuring frequency is higher than the predetermined communication frequency;
   determining, by the processor, whether or not the first sensor value is acquired from the first sensor device;
   in response to determining that the first sensor value is acquired, performing machine learning of a prediction model by the processor based on a correlation between the first sensor value and the second sensor value;
   determining, by the processor, whether or not the second sensor value is acquired;
   in response to determining that the second sensor value is acquired, generating a first sensor predicted value from the second sensor value by the processor using the prediction model in a period in which the second sensor value is acquired and the first sensor value is not acquired;
   determining, by the processor, an operation of an air-conditioning apparatus based on the first sensor predicted value; and
   controlling, by the processor, the air-conditioning apparatus based on the determined operation,
   wherein the air-conditioning control method further comprises changing the first predetermined communication frequency by using the first sensor predicted value and the first sensor value, and
   the processor periodically acquires, from the first sensor device at the changed predetermined communication frequency, the first sensor value transmitted by the first sensor device at the changed predetermined communication frequency,
   wherein the first sensor device measures the first sensor value at the predetermined measuring frequency, and stores in the memory of the first sensor device, such that a plurality of first sensor values are stored in the memory of the first sensor device before transmitting to the processor at the predetermined communication frequency,
   in each of the periodically acquiring at the predetermined communication frequency, the processor acquires, from the first sensor device, a number of first sensor values among the plurality of first sensor values stored in the memory of the first sensor device, wherein the number of the first sensor values acquired includes at least two first sensor values,
   the processor changes a number of first sensor values to acquire in a subsequent acquiring of the periodically acquiring of the first sensor value, by using the first sensor predicted value and a number of first sensor values acquired in a current acquiring, and
   in the subsequent acquiring of the periodically acquiring at the predetermined communication frequency, the processor acquires, from the first sensor device, the changed number of first sensor values transmitted by the first sensor device.

2. The air-conditioning control method according to claim 1, wherein
   the first sensor value, the second sensor value, and the first sensor predicted value include at least one of a temperature, humidity, and a quantity of particulate matter.

3. The air-conditioning control method according to claim 1, wherein
   the changing of the predetermined communication frequency includes changing the predetermined communication frequency based on a difference between the first sensor value measured at a time in a past and the first sensor predicted value generated from the second sensor value acquired at the same time as when the first sensor value was measured in the past.

4. The air-conditioning control method according to claim 1, wherein
   the machine learning of the prediction model is performed further based on the first sensor predicted value.

5. The air-conditioning control method according to claim 1, wherein
   the prediction model includes a plurality of the prediction models learned by learning methods different from each other, and
   the air-conditioning control method further comprises determining each of the prediction models to use from the plurality of prediction models by using the first sensor predicted value and the first sensor value.

6. The air-conditioning control method according to claim 1, further comprising
detecting an abnormality of the first sensor device by using the first sensor predicted value and the first sensor value.

7. The air-conditioning control method according to claim 1, further comprising
correcting the first sensor predicted value by using a difference between the first sensor value in a past and the first sensor predicted value generated from the second sensor value acquired in the past.

8. The air-conditioning control method according to claim 1, further comprising
acquiring an operating state of the air-conditioning apparatus,
wherein the correlation includes a correlation among the first sensor value, the second sensor value, and the operating state of the air-conditioning apparatus.

9. The air-conditioning control method according to claim 1, further comprising
acquiring weather information indicating a weather condition outside a space in which the first sensor device and the second sensor device are installed,
wherein the first sensor device and the second sensor device are installed at different positions in the same space, and
the correlation includes a correlation among the first sensor value, the second sensor value, and the weather information.

10. An air-conditioning control device comprising:
a memory that stores instructions; and
a processor, when executing the instructions stored in the memory, that performs operations including:
periodically acquiring, from a first sensor device at a predetermined communication frequency, a first sensor value transmitted by the first sensor device at the predetermined communication frequency, the first sensor device being provided at a different position than a second sensor device in a same space, the first sensor device including a memory that stores the measured first sensor value before transmitting to the processor;
periodically acquiring, from the second sensor device at a predetermined measuring frequency, a second sensor value that is measured at the predetermined measuring frequency, wherein the predetermined measuring frequency is higher than the predetermined communication frequency;
determining whether or not the first sensor value is acquired from the first sensor device;
in response to determining that the first sensor value is acquired, performing machine learning of a prediction model based on a correlation between the first sensor value and the second sensor value;
determining whether or not the second sensor value is acquired;
in response to determining that the second sensor value is acquired, generating a first sensor predicted value from the second sensor value by using the prediction model in a period in which the second sensor value is acquired and the first sensor value is not acquired;
determining an operation of an air-conditioning apparatus based on the first sensor predicted value; and
controlling the air-conditioning apparatus based on the determined operation,
wherein the processor further changes the predetermined communication frequency by using the first sensor predicted value and the first sensor value, and
the processor periodically acquires, from the first sensor device at the changed predetermined communication frequency, the first sensor value transmitted by the first sensor device at the changed predetermined communication frequency,
wherein the first sensor device measures the first sensor value at the predetermined measuring frequency, and stores in the memory of the first sensor device, such that a plurality of first sensor values are stored in the memory of the first sensor device before transmitting to the processor at the predetermined communication frequency,
in each of the periodically acquiring at the predetermined communication frequency, the processor acquires, from the first sensor device, a number of first sensor values among the plurality of first sensor values stored in the memory of the first sensor device, wherein the number of the first sensor values acquired includes at least two first sensor values,
the processor changes a number of first sensor values to acquire in a subsequent acquiring of the periodically acquiring of the first sensor value, by using the first sensor predicted value and a number of first sensor values acquired in a current acquiring, and
in the subsequent acquiring of the periodically acquiring at the predetermined communication frequency, the processor acquires, from the first sensor device, the changed number of first sensor values transmitted by the first sensor device.

11. The air-conditioning control method according to claim 1, further comprising:
acquiring an operating state of the air-conditioning apparatus and weather information outside a space in which the first sensor device and the second sensor device are installed; and
determining whether or not the operating state of the air-conditioning apparatus and the weather information are acquired;
wherein in response to determining that the second sensor value, the operating state and the weather information are acquired, the first sensor predicted value is generated from the second sensor value by using the prediction model based on a correlation between the first sensor value, the second sensor value, the operating state and the weather information.

12. The air-conditioning control method according to claim 1, further comprising:
in response to determining that the first sensor value is acquired from the first sensor device,
storing, by the processor, the acquired first sensor value into a storage; and
setting, by the processor, a learning flag as true,
wherein, the machine learning of the prediction model is performed, in a case where the learning flag is set as true.

13. The air-conditioning control method according to claim 1, further comprising:
in response to determining that the second sensor value is acquired,
storing, by the processor, the acquired second sensor value into a storage; and
setting, by the processor, a prediction flag as true,
wherein, the first sensor predicted value is generated, in a case where the prediction flag is set as true.

14. The air-conditioning control method according to claim 1, further comprising calculating a difference between the first sensor predicted value and the first sensor value,
- wherein the processor changes the predetermined communication frequency when the calculated difference is greater than a predetermined threshold value, and
- the processor periodically acquires, from the first sensor device at the changed predetermined communication frequency, the first sensor value transmitted by the first sensor device at the changed predetermined communication frequency.

\* \* \* \* \*